Patented Nov. 15, 1938

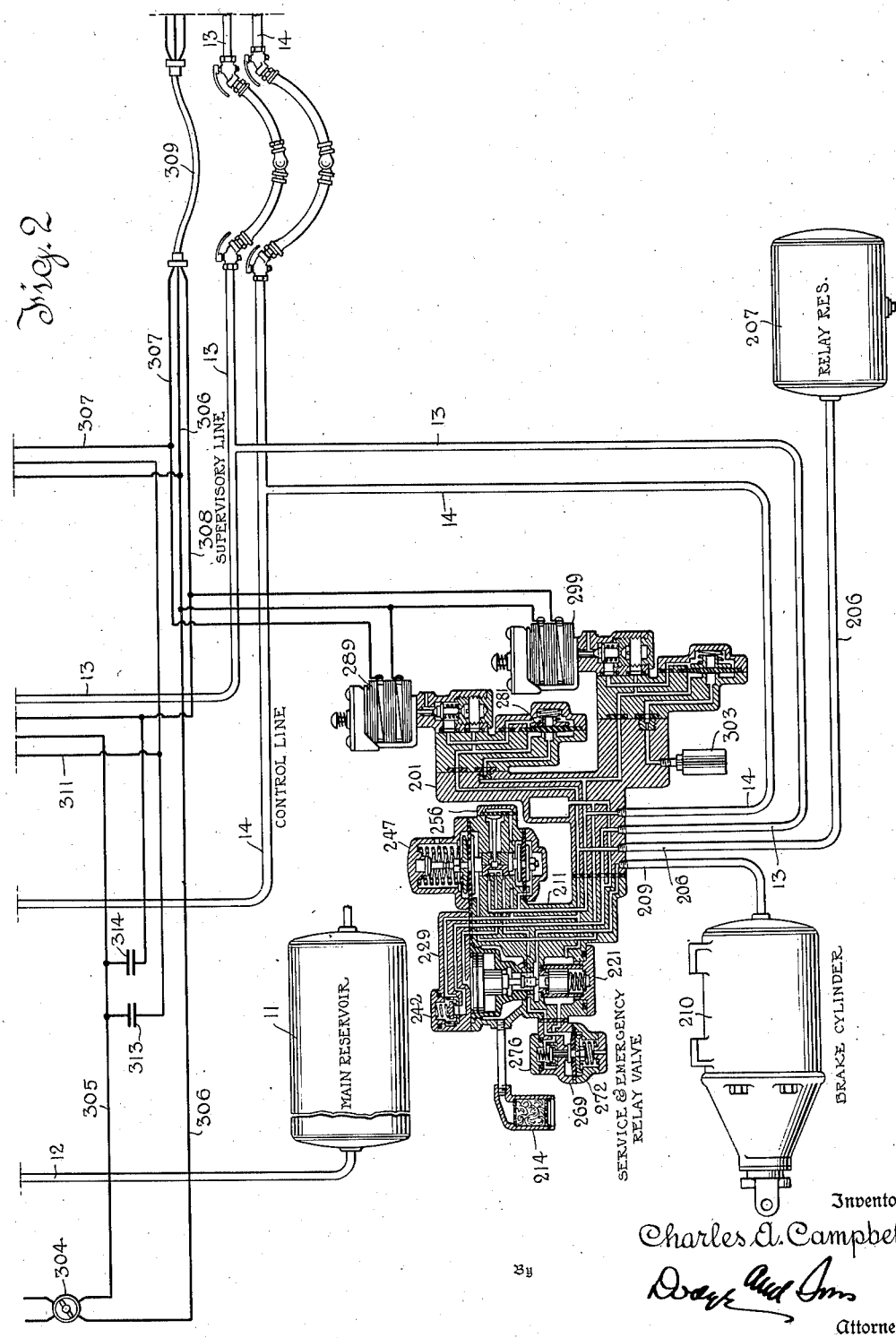

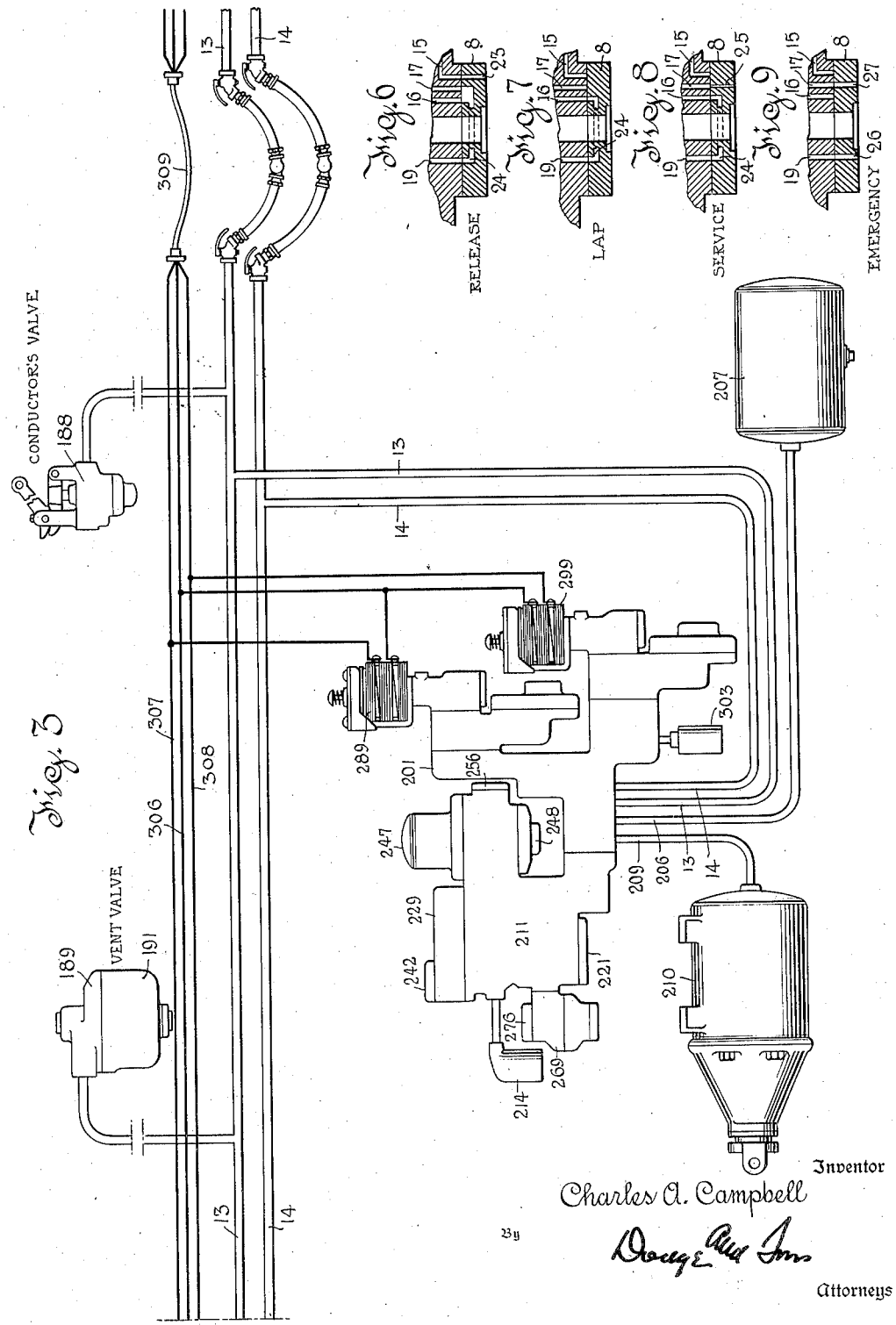

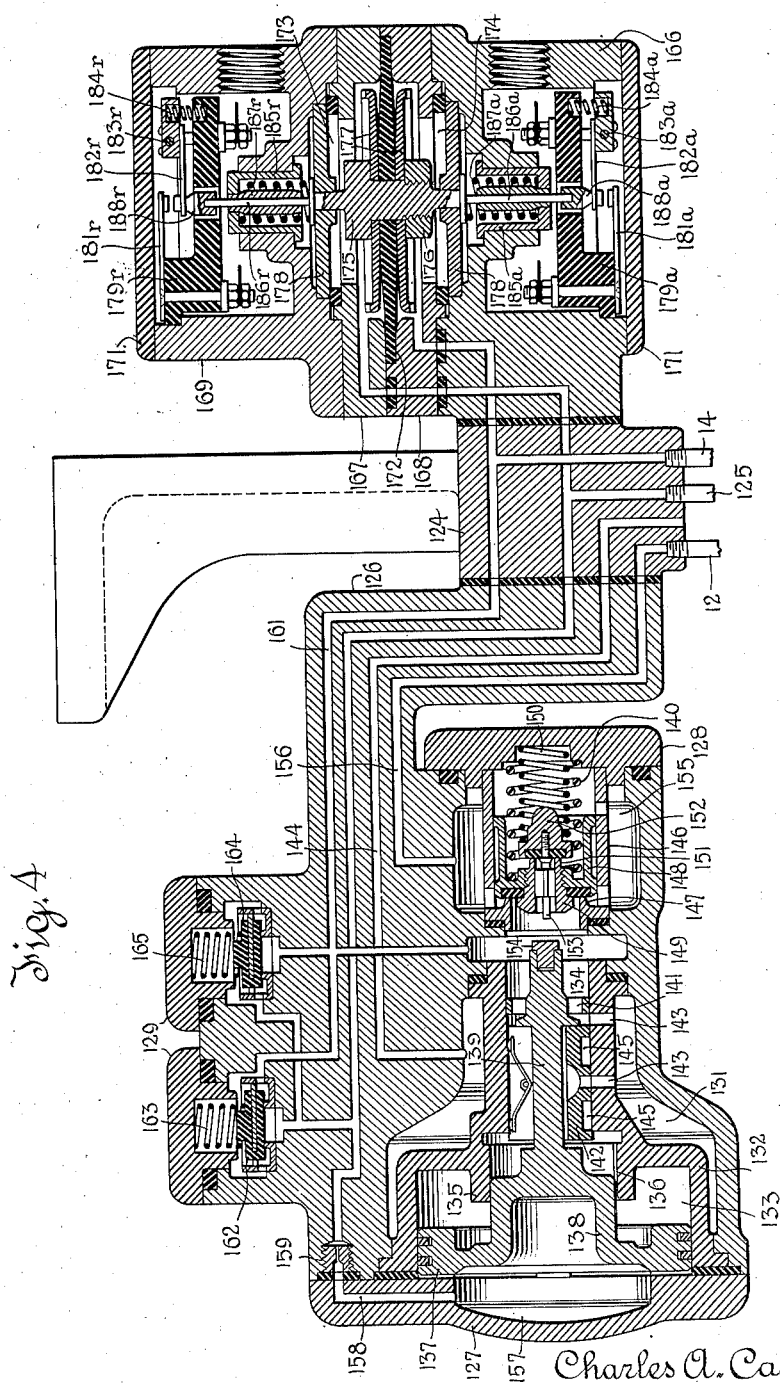

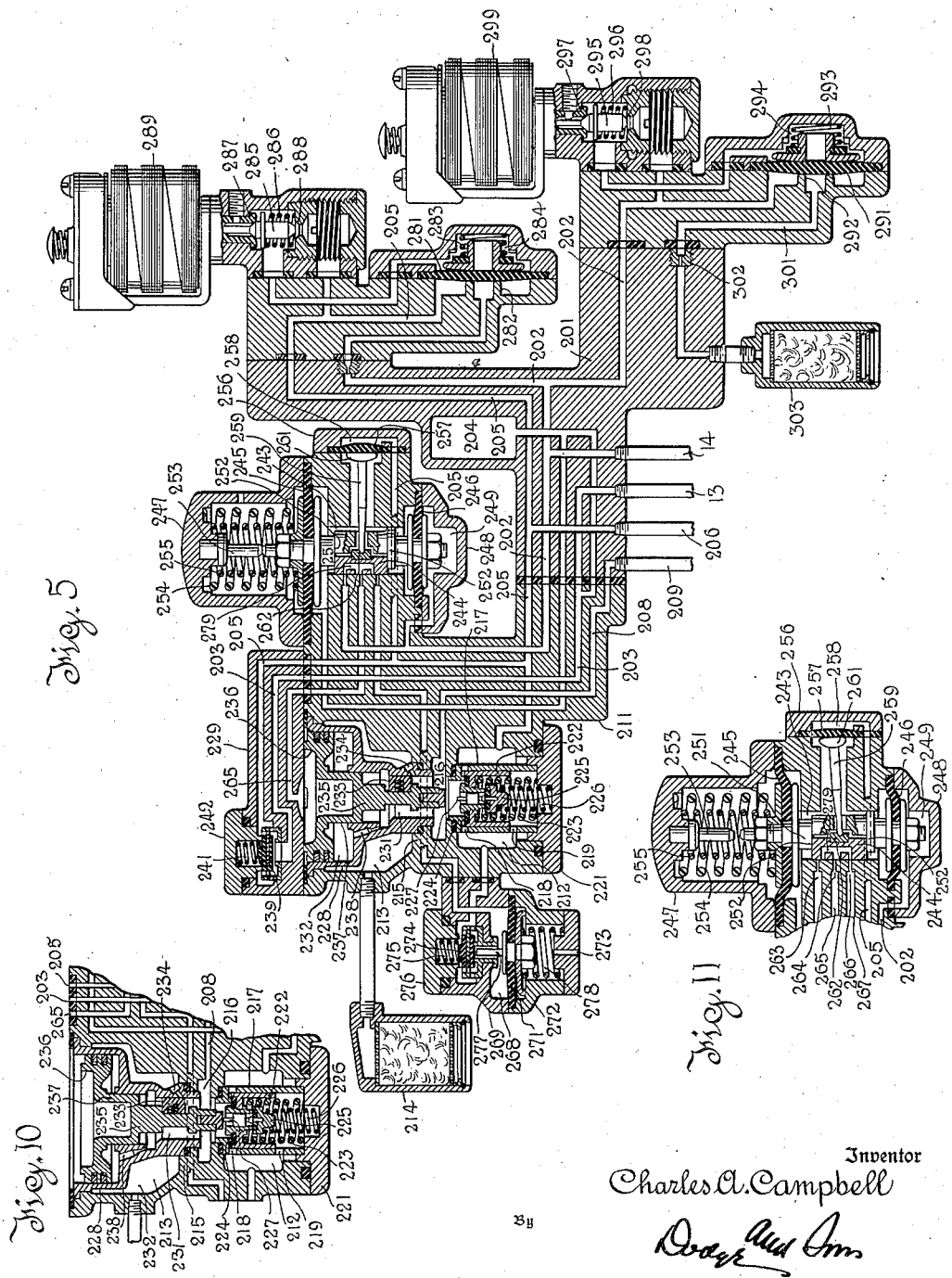

2,136,580

UNITED STATES PATENT OFFICE 2,136,580

FLUID PRESSURE BRAKE

Charles A. Campbell, Watertown, N. Y., assignor to The New York Air Brake Company, a corporation of New Jersey Application June 21, 1935, Serial No. 27,758

77 Claims. (Cl. 303—15)

This invention relates to air brakes, and particularly to straight air brakes of the type making use of a control line and a supervisory line, the supervisory line being primarily a reservoir line through which reservoirs on the various cars of the train are supplied with air, and the control line being primarily intended to control the application and release of the brakes by means of local relay valves on each car, which act to admit air from such local reservoirs to the brake cylinders, or to exhaust such air from the brake cylinders. The supervisory line also serves as an automatic brake pipe, in that means are provided to produce a brake application if the line is vented by rupture or otherwise.

A further important feature of the system is the use of a deceleration controller which normally assumes control of the pressure in the control line during brake applications. Such deceleration controller operates to establish desirable deceleration rates for service and emergency stops. The deceleration controller establishes a regulative pressure in a control reservoir and such pressure in turn determines the operation of a master relay mechanism which exercises direct control on the pressure in the control line. The master relay mechanism, just mentioned, is of a type in which there is a direct pneumatic control at the head of the train and also an indirect control by means of an electric relay switch and a plurality of electrically actuated admission and exhaust valves which admit pressure fluid to and exhaust it from the control line at intervals throughout the length of the train.

The reason for using a control reservoir is to establish a standard volume upon which the deceleration controller operates so that the operative characteristics of the deceleration controller will not be affected by variations in the length of the train and so that the deceleration controller need not handle large volumes of air. The reason for using two master relay mechanisms is to avail of the speed of operation of electric control and the attendant advantage of control at a plurality of points in the length of the control pipe, and at the same time to secure the certainty of operation inherent in a pneumatic relay.

Under normal operating conditions the relay switch responds more readily than the pneumatic relay so that the actual control of control line pressure is effected electrically rather than through the pneumatic relay.

The system includes a brake application valve responsive to reduction of supervisory line pressure and capable of producing an emergency application in response to such reductions. The application so produced may or may not be controlled by the deceleration controller, depending on whether or not the control line is intact and operative. This last function is incorporated in a change-over mechanism associated with the local relay valves on each car. The change-over mechanism also insures an application of the brakes independently of the application valve, if the state of charge of the brake system as a whole is below a chosen pressure, and will automatically produce an application whenever the state of charge falls below this pressure.

Another feature of importance is that the electrically actuated valves which supply air to the control line to produce an application on the various cars, derive their air supply from the relay reservoirs on the cars rather than directly from the supervisory line. Consequently the electrically actuated application valves do not affect supervisory line pressure sufficiently to cause undesired response of the application valve at the head of the train.

Another feature of the invention is the arrangement of the system in such a way that the deceleration rate is changed (reduced) in service applications near the end of the stop, and that in emergency applications the deceleration rate is inherently higher than it is in service applications and in maintained at such relatively high rate to the stop.

The system embodies as components individual pieces of apparatus, such as the engineer's brake valve, the deceleration controller, the master relay valve, the master relay switch, the change-over valve, etc., which, independently considered, contain patentable subject matter. These details are not claimed in the present application which is directed to the system as a whole, but such detailed subject-matter is not disclaimed as it forms the subject matter of independent applications.

Generally stated, the invention is designed for use on high speed passenger trains, but the utility of the invention is not strictly limited to this field.

A preferred embodiment is illustrated partly in section and partly in elevation in the accompanying drawings, in which—

Fig. 2 shows the remaining essential elements of such equipment for a locomotive or motor car.

Fig. 3 shows the equipment for the first trailing car with connnections through to successive cars of the train, it being understood that the system is applicable to trains made up of a number of cars, the equipment shown on Fig. 3 being repeated for successive cars.

Figure 1:
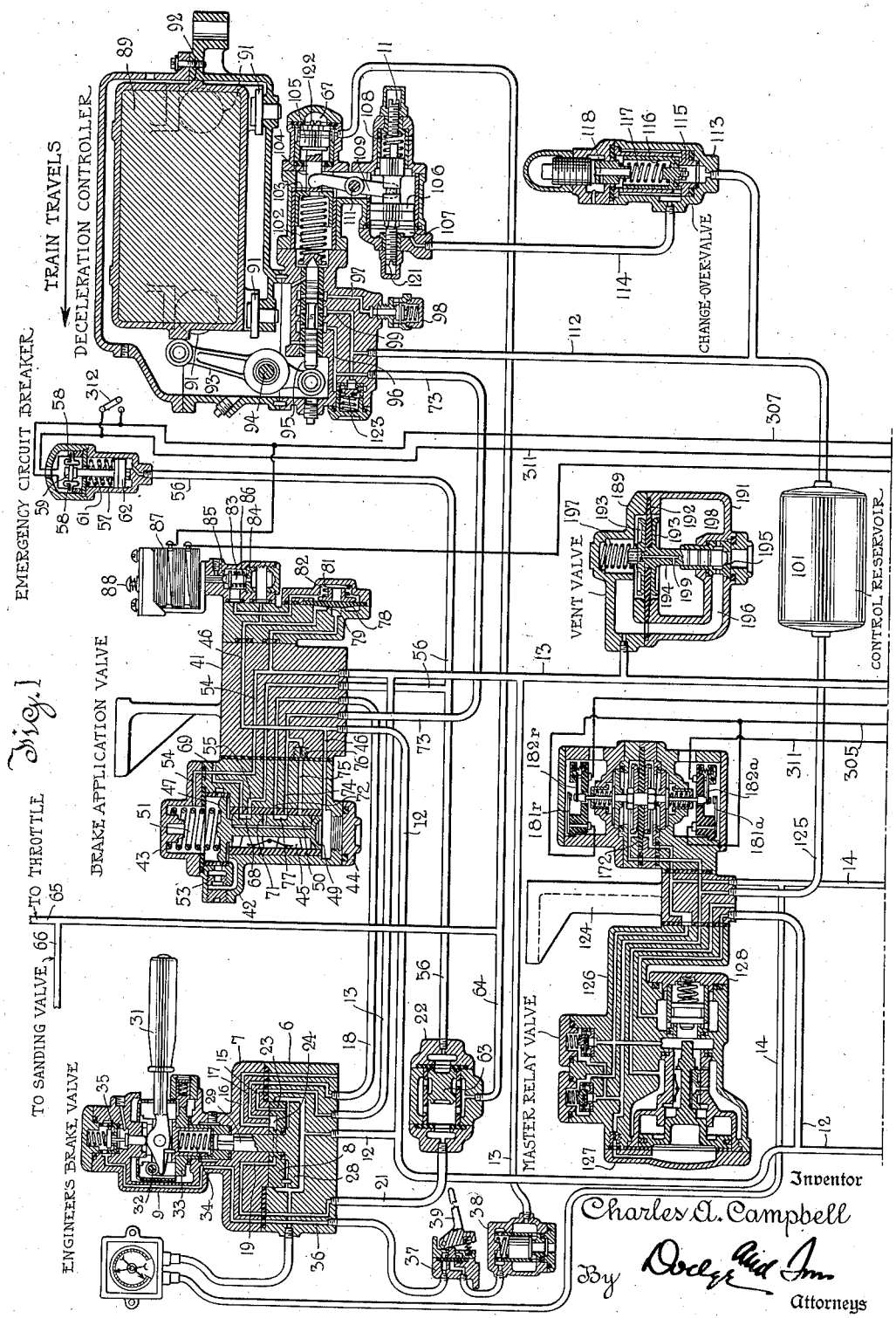
Fig. 1 shows a portion of the equipment of the locomotive or motor car.

Figs. 1, 2 and 3, when joined together, form a diagram of the essential elements of a complete system for a motor car and one trailer.

Fig. 4 is a section of the master pneumatic relay valve and the master relay switch.

Fig. 5 is a vertical section of the local relay valves used on the locomotive and on each car, together with the change-over valve and the electrically actuated valves associated therewith.

Figs. 6, 7, 8 and 9 are diagrammatic views showing respectively release, lap, service and emergency positions of the rotary valve 8 of the engineer's brake valve.

Fig. 10 is a fragmentary view showing the local relay valve in lap position.

Fig. 11 is a fragmentary view showing the change-over valve shifted to its abnormal position.

The sectional views are diagrammatic to the extent that the various ports are drawn as if they lay in a single plane, the purpose being to enable all flows to be traced on a single view.

Referring first to Figs. 1, 2 and 3, the engineer's brake valve comprises a pipe bracket 6 to which all pipe connections to this valve are made, a combined cap and seat portion 7, on the lower face of which is the inverted seat for the rotary valve 8, and a bonnet or housing 9 which encloses the deadman handle mechanism. A portion of the main reservoir volume is indicated at 11. The numeral 12 indicates the main reservoir pipe and all branches thereof in free communication therewith. The supervisory line and all branches in free communication therewith are indicated by the numeral 13. The control line and all branches in free communication therewith are indicated by the numeral 14.

As indicated in the drawings, the supervisory line and the control line extend throughout the length of the train and are connected from car to car by angle cocks and releasable couplings as shown. The pipe bracket 6 of the engineer's brake valve is connected to the main reservoir pipe 12 which supplies main reservoir air to the chamber in which the rotary valve 8 is mounted. The supervisory line 13 is connected to bracket 6 and communicates with a port 15 in the seat of the rotary valve. Also in the seat of the rotary valve are an atmospheric exhaust port 16 and a port 17 which may be called the "control port" because it is the port which normally exercises control on control pipe pressure through the brake application valve, deceleration controller, control reservoir and associated master relay mechanism. A pipe 18 connected to bracket 6 communicates with the control port 17. A port 19 in the seat of the rotary valve 8 is connected by a pipe 21 with one of the end ports of the double check valve 22.

In release position, shown in Figs. 1 and 6, a port 23 through the rotary valve admits main reservoir air to the supervisory line port, and a cavity 24 connects ports 17 and 19 with exhaust port 16.

In lap position, Fig. 7, port 19 is still connected with exhaust port 16 by cavity 24, but port 17 is blanked as is also port 15.

In service position, Fig. 8, port 19 is still connected with exhaust port 16 by cavity 24, and port 15 is blanked, but a relatively small port 25, through the rotary valve, supplies main reservoir air to the control port 17.

In emergency position, Fig. 9, cavity 24 no longer connects port 19 with exhaust port 16. Port 16 is blanked as is port 15, and a large through port 26 supplies main reservoir air to port 19 and thence through pipe 21 and check valve 22 directly to pipe 64 hereinafter described. A through port 27 of greater capacity than port 25 supplies main reservoir air to control port 17.

The flows defined by Figs. 6 to 9, inclusive, may be established by any suitable porting of the rotary valve and its seat, and since the particular layout to be adopted is a matter of design for which no novelty is here claimed, it appears unnecessary to elaborate the details of the actual porting of the rotary valve and its seat.

The valve 8 is turned by a head 28 on the stem 29. The stem 29 is turned through an intermediate mechanism by means of a brake valve handle 31. So far as is pertinent to the present invention it will suffice to say that the removable handle 31 is of the so-called deadman type. When in place, as shown, it is urged to swing upward about lug 32 on slotted hub 33 by a coil compression spring 34. Handle 31 forms an operative connection between spring 34 and normally closed valve 35 and in its upward position opens valve 35. The opening of valve 35 vents the port 36, which is connected through a normally open deadman foot valve 37 with an automatic vent valve 38 connected with the supervisory line 13. If the foot valve 37 be held closed by holding the pedal 39 depressed the handle 33 may be released without producing a deadman application. Similarly the pedal 39 may be released without producing a deadman application if the handle 31 be held depressed.

The vent valve 38 is of familiar construction (see patent to Campbell 1,860,451, May 31, 1932) and requires no detailed description beyond the statement that if valves 35 and 37, which are connected in series, are concurrently opened their venting effect causes the valve 38 to open and vent the supervisory line 13, which produces an application of the brakes as will be explained. So long as one or the other of the valves 35 and 37 is closed the vent valve 38 remains closed.

The brake application valve is carried by a ported bracket 41 to which the various pipe connections are made. The vent valve comprises a body 42 (bolted to bracket 41), a front cap 43, and a closing cap 44, as the housing structure. The body encloses a slide valve chamber 45 with which the reservoir line 12 directly communicates through a port 46. In chamber 45 is a seat for a slide valve 50. Communicating with chamber 45 is a cylinder which receives piston 47. The piston 47 has a stem with spaced shoulders which embrace the slide valve 50 and cause it to partake of the movements of the piston. A spider 49 guides the piston stem at its inner end. A coil compression spring 51 reacts between the front cap and the piston, forcing the piston inward to a normal position indicated in the drawings. In the normal position a charging by-pass around the piston from the chamber 45 to the space within the front cap is afforded by a choke fitting 53 which is interchangeable to permit adjustment of the flow capacity.

The space within the front cap is connected by way of port 54 with the supervisory line 13. It follows that under normal conditions the supervisory line 13 is charged through the choke 53 from the main reservoir, but this charging connection is interrupted when the piston 47 moves outward and seats against the front cap gasket. A port 55 in the seat of slide valve 50 is connected by a pipe 56 to the emergency circuit breaker 57. This comprises two contacts 58 which are normally connected by a contactor 59 urged to circuit closing position by coil compression spring 61 and adapted to be forced to circuit breaking position by a piston 62 which is subject to the pressure in the pipe 56. A branch of the pipe 56 is also connected to one end of the body 22 of the double check valve, whose other end is connected to the pipe 21, as already described. The check valve element 63 moves under pressure in whichever one of pipes 21 or 56 is under pressure, to connect such pipe with the pipe 64 without connecting 21 and 56 together. One branch of pipe 64 leads to a throttle controller for the propelling motors of the train, as indicated by the legend at 65, and another branch leads to the sanding valve, as indicated by a legend at 66. A third branch of pipe 64 leads to the cylinder 67 which operates means for loading the deceleration controller to establish an emergency deceleration rate. For present purposes it will suffice to say that when pressure is admitted to the pipe 64, from either pipe 21 or pipe 56, the throttle of the propelling motor is controlled, the sanding valve is actuated and the deceleration controller is set for an emergency deceleration rate.

In normal positions of the slide valve 50 the port 55 is vented to atmosphere by way of cavity 68 and exhaust port 69, but in the outer position of the slide valve 50 a through port 71 in the slide valve 50 admits reservoir air to the port 55 and thus puts the pipe 56 under pressure. The pipe 18 which leads from the control port 17 of the engineers' valve, leads to a port 72 in the seat of slide valve 50. A pipe 73 leads from the two parts 74 and 75, a choke 76 being interposed in the port 75 as shown. When the slide valve 50 is in normal position, as shown in Fig. 1, a cavity 77 connects port 74 with port 72 and port 75 is blanked. When the piston 47 moves outward ports 74 and 72 are disconnected, port 74 is blanked and port 75 is exposed so that main reservoir air flows to pipe 73 at a rate determined by the size of the choke 76. The pipe 73 leads to the inlet port of the modulating valve of the deceleration controller (decelerometer) as will be hereinafter described.

In release position of the engineer's brake valve main reservoir air is fed to the supervisory line through a relatively small port 23. After an emergency application produced by venting of the supervisory line, and attendant shifting of the application valve piston 47, it is at times desirable to effect quick recharge of the supervisory line. Manually operable means to effect this result are combined with electrically actuated means to feed the supervisory line rapidly during applications when the supervisory line is charged and prevent such feed during applications when the supervisory line is vented.

Mounted on bracket 41 is a valve which when open freely connects a branch of main reservoir port 46 with a branch of supervisory line port 54. The valve takes the form of a flexible diaphragm 78 coacting with an annular seat 79. Valve 78 is urged toward its seat by a spring 81 insufficient to hold the valve closed unless reinforced by main reservoir pressure in chamber 82. A double beat poppet valve 83 seats alternatively against a supply seat 84 and an atmospheric exhaust seat 85, to subject chamber 82 alternatively to atmospheric pressure or main reservoir pressure. A coil compression spring 86 urges valve 83 toward the atmospheric seat so that the chamber 82 is normally at main reservoir pressure and valve 78 is closed. An armature (not shown) shiftable by energization of winding 87, or by manual depression of button 88, serves to force valve 83 against supply seat 84. This vents chamber 82 and allows valve 78 to open. The energization of winding 87 is controlled in part by the circuit breaker 57 as will be more fully explained.

The deceleration controller includes a graduating valve of the inlet and exhaust type, and preferably of the inside cut-off piston type, which modulates the pressure in control reservoir 101 hereinafter described. An inertia mass is indicated at 89 and is shown as guided on rollers 91 so that it moves on the train in a direction parallel to the direction of motion of the train. The particular embodiment shown is intended for single end service and the direction of motion of the train is indicated on Fig. 1 by the arrow and the legend "Train Travels." The mass 89 is mounted to move as freely as possible and its normal (rearward) position is defined by the stop 92. At its forward end it reacts through a roller bearing against the upper end of a lever 93 fulcrumed at 94. The lower end of the lever 93 reacts through a roller bearing on the forward end of the modulating valve 95 which is shown as a piston valve of the inside cut-off type, having a very slight lap with reference to the control reservoir supply port 96 and the exhaust port 97.

The port 96 is connected with the pipe 73 and the port 97 connects to atmosphere through a lightly loaded retainer 98. Between the ports 96 and 97 is the control reservoir port 99. The valve 95 in its normal position freely connects ports 96 and 99. As the weight 89 moves forward in response to deceleration of the train produced by a brake application, the effect is first to throttle and finally close the port 96, and shortly after the port 96 is closed to commence to open the port 97, such opening being progressive.

The control port 99 is connected to the control reservoir 101. The forward motion of the inertia mass 89 is resisted by a coil compression loading spring 102 which reacts against the rear end of the modulating valve 95 and which is stressed with one intensity for service applications and with a higher intensity for emergency applications. The spring 102 is sustained by a cup-like slidable spring seat 103 which is in one-way thrust relation, through a slotted push rod 104, with the piston 105 working in cylinder 67 already described. During emergency application (but not in service applications) the pipe 64 is under pressure and the piston 105 is forced forward to the limit of its motion, establishing a relatively heavy compressive stress in spring 102, and loading the deceleration controller to establish a high rate of deceleration. This persists as long as pipe 64 is under pressure.

The loading of the spring 102 in service applications is controlled by a piston 106 which works in the cylinder 107 against the resistance of a light return spring 108. The piston 106 is connected by a rock lever 109 fulcrumed at 111 with the spring seat 103. As clearly shown in Fig. 1, the upper end of the lever 109 enters the slot in push rod 104. There is sufficient clearance in this push rod to permit the full range of motion of the piston 105. Also the piston 106 may operate on the spring seat 103 without interference by the piston 105.

The control reservoir 101 is connected with port 99 by a pipe 112, and from this pipe a branch leads to the body 113 of a change-over valve. The body of the change-over valve is connected by a pipe 114 with the working space of the service-loading cylinder 107. Mounted in the body 113 and sealing against a seat 115 which controls communication to the pipe 112 is a cup-shaped valve piston 116 urged in a closing direction by coil compression spring 117. The upper end of the valve 116 controls an atmospheric vent port 118. When the valve 116 is against the seat 115 the pipe 114 is connected to atmosphere. Control chamber pressure in the pipe 112 acts on a relatively small area of the piston 116 within the seat 115, until the valve 116 starts to move upward. As soon as it does start to move upward the whole area of the piston 116 is exposed so that the valve moves up its full stroke closing the atmospheric vent port 118 and admitting control chamber pressure to the service loading cylinder 107 by way of pipe 114. Spring 117 is of such strength that as soon as a light braking pressure is developed in the control reservoir 101, the valve 116 will move upward. Thus shortly after the start of a service application the valve 116 shifts and subjects the piston 106 to control chamber pressure. This shifts piston 106 to establish a suitable loading stress in the spring 102 to maintain an appropriate service deceleration rate.

Since the coefficient of friction increases as the train slows the deceleration controller functions gradually to reduce the pressure in the control reservoir 101 and as a state of rest is approached the pressure in reservoir 101 will reach a value at which the spring 117 shifts the valve 116 to its lower seat. The effect of this is to disconnect cylinder 107 from control reservoir 101 and vent the cylinder 107 to atmosphere. This allows a retreat of the spring seat 103, thus establishing a lower deceleration rate which will permit the train to come to a smooth stop. This reduction in deceleration rate occurs at a train speed in the neighborhood of five miles per hour, the action at such speed being determined by a proper choice of the compressive strength of spring 117. The higher deceleration rate effective in service may be determined by adjusting a threaded stop 119 and the lower deceleration rate at the termination of service stops may be determined by adjusting a threaded stop 121. The stops 119 and 121 define the limiting positions of the service loading piston 106. The heavy loading of the spring 102 used in emergency is determined by adjusting a threaded thrust screw 122 in piston 105 which establishes the relation of the piston to the push rod 104.

These details per se are not a feature of the present invention, but are described and claimed in my copending application Serial No. 724,990, filed May 10, 1934.

A check valve 123 permits flow from the control reservoir pipe 112 to the control pipe 73 and closes against reverse flow. This is to permit release of an application after the deceleration controller has taken control. The necessity for such a connection is apparent when it is remembered that during brake applications sufficient to effect the deceleration controller, the port 96 is blanked by the valve 95 substantially throughout a stop. This is true for the reason that the deceleration controller acts to reduce pressure in the reservoir 101 gradually as the train slows.

The function of the control reservoir 101 is to control the pressure in the control line and this it does through the master relay mechanism about to be described.

Theoretically the pipe 112 might be connected directly to the pipe 14 for the actual function of the relay mechanism is to establish in the pipe 14 a pressure corresponding to that in the reservoir 101. Practically this is not desirable for a number of reasons. In the first place the deceleration controller valve would have to handle a large volume of air so that for desirably rapid action the deceleration controller would have to be of unduly large size. Furthermore, the volume of air to be handled by the deceleration controller valve would vary with the length of the train so that its time characteristics would change with the length of the train.

The use of the control reservoir with the relay mechanism permits standardization of the locomotive equipment regardless of the length of the train, and permits all the control apparatus to be made of a size commensurate with the limited volume of the reservoir 101. Nevertheless loaded bypass valves are provided acting in each direction between the control reservoir and the control line to provide communication in the event of failure of the master relays to function.

The master relay mechanism (see Figs. 1 and 4) is supported on a ported bracket 124 to which all pipe connections are made. These are with the main reservoir pipe 12, control line 14 and a pipe 125 leading to the control reservoir 101.

Bolted to bracket 124 is the body 126 of the master pneumatic relay, which carries a front cap 127, rear cap 128 and cover caps 129 over the bypass check valves. Gaskets are used as indicated. Clamped in a chamber 131 in body 126 and sealed thereby by gaskets as shown is a bushing 132 forming a piston chamber 133 and a slide valve chamber 134. Between the two is a cylindrical guide 135 having a throttling groove 136.

Working in chamber 133 is a piston 137 having a cylindrical hub 138 which makes a free fit in guide 135. Though a groove 136 is shown to illustrate affirmatively a restricted communication between 133 and 134, a free fit between 135 and 138 will suffice. Hub 138 carries a stem 139 on which is a ported guiding ring or spider 141.

Confined with slight lost motion between shoulders on stem 139 is an exhaust slide valve 142 of the grid type controlling two exhaust ports 143 in the seat formed in valve chamber 134. The space within chamber 131 surrounding bushing 132 is vented to atmosphere by way of passage 144. The grid type valve is characterized by quick opening. The exhaust is open when the piston 137 is in the normal (outer) position shown.

As the piston moves inward the ports 143 are closed simultaneously and just as or slightly after they close loading cavities 145 in the lower face of the slide valve are exposed to ports 143. Because of these cavities the slide valve is loaded and its frictional resistance is increased as soon as control pipe pressure builds up. This loading resists an ensuing movement to release until control pipe pressure has been substantially depleted by the operation of the electrically actuated release valves hereinafter described.

The inlet valve assembly is carried by a ported cage bushing 146 clamped against a gasket by cap 128. Cage 146 has a seat 147 for the main inlet poppet valve 148. Valve 148 has a rubber seating face clamped by an axially ported nut 149 which terminates in a seat 151 for a pilot poppet valve 152. The valve 152 has a rubber seating face clamped by a flange on stem 153 threaded into the valve. Stem 153 projects through the axial bore of nut 149 and beyond the same. Valves 148 and 152 are urged closed by coil compression springs 140 and 150.

The parts are so arranged that after piston 137 has moved far enough to cause valve 142 to lap exhaust ports 143, a hardened insert 154 in the end of stem 139 engages pilot valve stem 153. If further motion occurs against the resistance of spring 150 and main reservoir pressure on valve 152, the latter valve will be unseated. This unloads main valve 148 which is opened by engagement of insert 154 with nut 149 on continued inward motion of the piston 137.

The chamber 155 in which cage 146 is mounted is connected with main reservoir pipe 12 by passage 156. The space 157 on the outer side of piston 137 is connected by passage 158 with control reservoir pipe 152. An interchangeable choke 159 is interposed in passage 158. The valve chamber 134 is connected with control pipe 14 by passage 161.

Thus piston 137 is subject on its opposite sides to control reservoir and control pipe pressures. Inward motion of the piston under rising control reservoir pressure serves first to close the exhaust ports and then to admit main reservoir air to the control pipe. It follows that control pipe pressure is varied in response to variations in control reservoir pressure, subject to such lag as is imposed by choke 159 and the loading effect of cavities 145. Hub 138 with restricted passage 136 protects a substantial area of the inner face of the piston 137 against pressure surges in the control pipe 14 and also against blast effects of air entering through the inlet valve.

The purpose of resisting motion of the pneumatic master relay valve from lap position to both application and release position is to permit a more sensitive electric master relay to act to admit and exhaust air to and from the control pipe without interference. Free motion of the pneumatic master relay valve to lap position is essential to ensure prompt closing of the exhaust ports, but local admission and exhaust of air to and from the control pipe would each affect the adjacent electric relay and modify its response with detrimental results. The normal action of the pneumatic relay in the production of an application is to lap and then remain inert. Because of its loading in lap position it does not move to release position until control pipe pressure reaches a low value.

To bypass the master relay should this mechanism fail to function in either application or release, two loaded check valves, reversely arranged, are interposed between ports 158 and 161. Application bypass check valve 162 opens when spring 163 is overpowered to permit flow from control reservoir port 158 to control pipe port 161 and release bypass check valve 164 opens when spring 165 is overpowered to permit flow from control pipe port 161 to control reservoir port 158. The springs 163 and 165 resist differentials sufficient to ensure normal operation of the pneumatic master relay, the bypass valves being a safeguard against loss of braking action.

The master relay switch is mounted on bracket 124 on the opposite side from the body 126 of the master pneumatic relay. Its body is composed of a housing 166 for the application switch, which housing is bolted to bracket 124, two diaphragm housing sections 167 and 168, a housing 169 for the release switch, and two caps 171. Gaskets are used as indicated. Connecting bolts and screws are not visible on the drawings.

The pressure responsive element is a flexible diagram 172 clamped at its periphery between housings 167 and 168 and subject on its upper side to control reservoir pressure in chamber 173 to which a branch of port 158 leads, and on its lower side to control pipe pressure in chamber 174 to which a branch of port 161 leads. A stem 175 extends through the center of the diaphragm and nut 176 threaded thereon clamps the center of the diaphragm between two convex thrust plates 177. These constrain the diaphragm to even flexure and also coact with the housings to limit displacement of the diaphragm. The opposite ends of stem 175 work through and are guided by guide plates 178, one clamped between housings 166 and 168 and the other between housings 167 and 169.

The ends of stem 175 enter into selective thrust engagement with an inlet switch mechanism in housing 166 and an exhaust switch mechanism in housing 169 as the diaphragm is displaced down or up by varying pressure differentials between chambers 173 and 174. Mechanically the two switches are identical. Parts of the application switch are distinguished by the letter $a$.

Mounted in housing 166 is an insulating base 179a on which are mounted a fixed contact 181a and a coacting moving contact 182a pivoted at 183a and urged in a circuit breaking direction by spring 184a. Guided in thimble 185a is a headed push rod 186a. A precise sliding fit is used to resist leakage. The head serves as a seat for the coil compression spring 187a and as a stop to engage the adjacent guide plate 178 and limit motion of the push rod under urge of the spring. The push rod carries an insulating button 188a through which it may react against contact 182a to close the switch.

The components of the release switch in housing 169 are identical and are similarly numbered with the distinguishing letter $r$.

On each car of a train a conductor's vent valve 188 is provided to vent the supervisory line to atmosphere. Such a valve appears in Fig. 3. Its construction follows standard practice in the art, and hence need not be described.

Also mounted on each trailer car, and on the motor car are automatic vent valves. One is shown in elevation in Fig. 3 and another in section in Fig. 1. They are connected with the supervisory line and act in response to a sudden reduction of supervisory line pressure, however caused, to vent the line to atmosphere. The valve housing comprises a cap 189 and a body 191 between which is peripherally clamped a flexible diaphragm 192. Clamped to the center of diaphragm 192 is a hub structure comprising thrust plates 193 and a stem 194 whose lower end coacts with vent valve seat 195 to control venting flow from the supervisory line through passage 196. A spring 197 urges stem 194 in a vent closing direction.

Diaphragm 192 separates a chamber 198 from the supervisory line, except for a restricted passage 199, through which chamber 198 is charged and through which reflux occurs at a rate sufficient to prevent upward motion of the diaphragm against the urge of spring 197 when supervisory pressure is reduced slowly, but not when it is reduced rapidly.

The function of these vent valves is to speed up the propagation throughout the length of the supervisory line of an emergency reduction, initiated at a conductor's valve, or by rupture of the pipe or by operation of the deadman valve, and thus hasten response of the application valve piston 47, and also of the change-over valves associated with the local relays.

The locomotive and each car in the train (or each truck, particularly in the case of articulated trains) is equipped with a braking unit now to be described with reference to Figs. 2, 3 and 5.

A ported pipe bracket 201 is provided, and to this all pipe connections are made. The control line port 202 is connected to the control line 14. A supervisory line port 203 is connected to the supervisory line 13 and has a branch leading to a timing chamber 204. A relay reservoir port 205 is connected by pipe 206 to the relay reservoir 207. A brake cylinder port 208 is connected by pipe 209 to the brake cylinder 210.

Bolted to body 201 is the body 211 which houses the relay valve and the change-over valve mechanisms. The ports 202, 203, 205 and 208 have similarly numbered extensions in the body 211. One portion of the body 211 is formed with two alined chambers 212 to which branch of port 205 leads and 213 which is freely vented to atmosphere through muffler 214. The two chambers are separated by an annular partition 215 in which is formed the brake cylinder chamber 216. The brake cylinder port 208 leads to chamber 216.

Sealed against the lower face of partition 215 by means of a gasket, as shown within chamber 212, is a cylindrical valve cage 217 having ports 218 and 219 near its opposite ends. The cage is held in place by a removable cover plate 221 which closes the end of chamber 212. Slidable in cage 217 is a piston-like poppet valve 222 urged in a closing direction (upward) by a coil compression spring 223. The valve seats on a seat rib 224 formed by the upper end of the cage 217. The valve has a rubber seating face as shown.

Mounted in the valve 222 and controlling a through port in the end thereof is a pilot valve 225 of the poppet type seated by a coil compression spring 226 lighter than the spring 223. The valve 225 has a rubber seating face and an extension stem 227 which extends beyond the upper face of valve 222 to ensure serial opening of the valves 225 and 222 in the order stated. The valves 225 and 222 control the flow of relay reservoir air from chamber 212, to chamber 216, and thence to the brake cylinder. Valve 225 acts as a pilot valve provided for service flow and relieves the seating pressure on valve 222 so that this valve opens without undue resistance if the actuating device moves far enough to unseat it. This occurs in emergency applications and at such times the lower end of valve 222 blanks port 219.

Mounted in and spaced from the walls of chamber 213 is a bushing 228 which is sealed to the body 211 at both ends by gaskets as indicated. The bushing is held under sealing pressure by a removable cap 229 and this bushing forms the slide valve chamber 231 and a cylinder 232.

In the slide valve chamber is a seat for an exhaust slide valve 233 which controls an exhaust port 234 in the seat. The slide valve is held to its seat by a spring, as indicated, and is confined with slight lost motion between collars on stem 235 of an actuating piston 236 which works in the cylinder 232. The end of stem 235 engages the extension 227 of the pilot valve 225 after the valve 233 has closed the exhaust port 234 and the lost motion between the stem 235 and the exhaust valve 233 is such as to permit graduation of supply flow by opening and closing pilot valve 225 while the exhaust valve 233 remains at rest in closed position.

Between piston 236 and stem 235 is a central hub or enlargement 237 which makes a free fit in the upper end of the slide valve chamber 231. A restricted port 238 provides for retarded communication and thus protects the piston from the blast effect of air admitted by the valves 225 and 222 while subjecting the lower side of the piston 236 to brake cylinder pressure.

To protect the charge in the relay reservoir 207 in case the supervisory line 13 is vented, a check valve is interposed in the path of reservoir charging flow. This valve might be variously located but a convenient location interposes it between ports 203 and 205 in the cap 229, and it it so shown in Fig. 5 where the charging check appears at 239. It is of the rubber poppet type and is seated by a spring 241. The valve and spring are accessible by the removal of a cap 242.

Formed in the body 211 is a change-over valve chamber 243 provided with a seat for change over slide valve 244. The upper end of the chamber 243 is closed by a flexible diaphragm 245 and the lower end is closed by a flexible diaphragm 246, the effective area of diaphragm 245 being approximately twice that of diaphragm 246. Diaphragm 245 is clamped in place at its periphery by a cap 247 which is vented to atmosphere as indicated so that the outer face of the diaphragm is subject to atmospheric pressure. Diaphragm 246 is clamped at its periphery by a cap 248, the chamber 249 within the cap being subject to control line pressure admitted through a branch of port 202.

The diaphragms are connected together by a stem 251 which carries clamping disks, as shown, the disks embracing the middle portions of the two diaphragms and being retained by nuts threaded on the stem 251, as shown. Stem 251 has spaced collars 252 which embrace the slide valve 244 so that the valve partakes of the longitudinal movement of stem 251.

The upper or normal position of stem 251 (and consequently of valve 244) is defined by a stop pin 253 fixed in cap 247. Two coil compression springs 254 and 255 react between the cap 247 and the upper diaphragm clamping disk so that they act to urge the stem 251 downward. A cap 256 clamps a flexible diaphragm 257 at its periphery and encloses a chamber 258 to which a branch of relay reservoir port 205 leads. A thrust pin 259 with bearer disk 261 transfers the inward thrust of diaphragm 257 to a socketed thrust block 262 on the back of change over slide valve 244. In this way the valve is held seated at all times.

The seat for valve 244 has three ports, a port 263 to which control passage 202 leads, a port 264 connected by passage 265 with a space above the relay piston 236, and a port 266 connected by passage 267 with the chamber 268 and the body 269 of the pressure limiting valve. The lower wall of chamber 268 comprises a flexible diaphragm 271 clamped at its periphery by a cap 272 which is vented to atmosphere at 273. A check valve 274 with seating spring 275 retained by cap 276 controls flow from a branch of the relay reservoir passage 205 to chamber 268, and closes in the direction of flow toward said chamber.

Clamped to the center of diaphragm 271 by a disk and nut, as shown, is a stem 277 which on upward motion of the diaphragm unseats the valve 274. A coil compression spring 278 reacts between the cap 272 and the diaphragm clamping disk to urge the stem 277 and diaphragm 271 upward. The strength of springs 275 and 278 are so related to the area of the diaphragm 271 that valve 274 will close when compression in the chamber 268 reaches a safe upper limit. The valve determines the limiting pressure exerted on the upper side of piston 236 at times when the deceleration control valve is ineffective and the limiting pressure is so chosen that the resulting brake application will be insufficient to lock the wheels at any train speed. This limit depends on characteristics of the particular train, but in actual service with one train a satisfactory limiting pressure was found to be 60 pounds gage, and that value will be used for purposes of discussion.

The slide valve 244 is ported as indicated at 279, the port 279 having three branches so arranged that when the valve 244 is in its normal upper position control port 263 is connected to relay cylinder port 264 and the limiting valve port 266 is blanked. In the lower or change over position of valve 244 control port 263 is blanked and limiting valve port 266 is connected with relay cylinder port 264.

The electrically actuated valves which admit air to the control pipe during applications, and exhaust air from the control pipe during releases are mounted in bracket 201 on each car or truck.

A rubber diaphragm valve 281 coacting with annular seat 282 controls the flow of air from a relay reservoir 207 (via pipe 206 and a branch of port 205) to a branch of control pipe port 202. This valve is urged closed by spring 283 which is insufficient to hold the valve closed unless reinforced by relay reservoir pressure acting in chamber 284 behind the valve. Admission and exhaust of pressure to and from chamber 284 are controlled by the double beat poppet valve 285 biased by spring 286 to close against exhaust seat 287 and open inlet seat 288. Thus valve 281 is normally closed. Energization of winding 289 shifts valve 285 venting chamber 284 and allows valve 281 to be forced open by reservoir pressure.

Exhaust flow from the control line is controlled by a structurally identical electrically controlled valve mechanism. The parts 291 to 299 correspond to the parts 281 to 289 respectively. Exhaust occurs from a branch of port 202 past valve seat 292, when winding 299 is energized. The flow is through passage 301, is regulated (delayed) by choke 302 and the noise is muffled by muffler 303.

The locations of the electrically actuated valves are important. While they may be mounted as shown on the same bracket as a local relay, they are spaced by sufficient port length to avoid over-response of the relay.

Valve 281 takes air from the local reservoir 207 rather than directly from the supervisory line 13. Consequently although the line 13 ultimately supplies the air for opening of valve 281 does not cause a sudden reduction of supervisory line pressure. Hence the vent valves 189 can be made quite sensitive without danger of their responding to pressure reductions produced by valve 281.

A manually operable normally closed electric switch 304 controls the supply of electric current to line 305 called for convenience the supply line and a line 306 called for convenience the common return line. The common return line 306, an application line 307 and a release line 308 extend from end to end of the train, these lines being insulated from one another and being connected from vehicle to vehicle by jumper cables 309. Cables 309 are diagrammatically illustrated but will be understood to comprise individual connections for each of these lines.

Application windings 289 and also winding 87 are connected between application line 307 and common return line 306. Release windings 299 are connected between release line 308 and common return line 306 as clearly shown in Figs. 2 and 3.

The supply line 305 is connected with the contacts 181a and 181r of the relay application, and release switches in housings 166 and 169. The contact 182r of the relay release switch is connected directly with the release line 308.

The contact 182a is connected by line 311 to one contact 58 of the emergency circuit breaker 57 whose other contact 58 is connected with a branch of application line 307, so that the emergency switch when open breaks the application circuit. The purpose of this is to prevent energization of windings 87 and 289 in those emergency applications produced by depletion of supervisory line pressure. Such applications cause switch 57 to open the application circuit. The high speed propagation incident to electric propagation is not essential in deadman and conductor valve emergencies, and would be harmful in the event of a break-in-two because the opening of valves 78 would vent the main reservoir to the supervisory line and the opening of valves 281 would vent the local reservoirs 207 to control line 14, both of which would be ruptured by a break-in-two. Consequently switch 57 is regarded as a valuable safety factor.

On articulated trains a break-in-two would wreck the train, and is virtually precluded by the construction. It thus becomes possible to protect the supervisory and control lines effectively against rupture. In such case it is possible to omit switch 57 and connect line 311 permanently with application line 307. The system has been successfully operated in this way and can be conditioned so to operate by closing the manual switch 312 which bypasses emergency switch 57.

With switch 312 closed emergency switch 57 is, in effect, eliminated and valves 78 and 281 function in conductors and deadman emergencies. Condensers 313, 314 are connected across the application and release switches respectively to reduce arcing.

*Operation*

Under normal running conditions with brakes released the supervisory line is charged to main reservoir pressure and the control line is at atmospheric pressure. The brake valve is in release position and the application valve is in the position shown in Fig. 1, so that supervisory line is fed through ports 23 and 53. Control reservoir is at atmospheric pressure, reservoirs 207 are charged and the change-over valve is in the position of Fig. 5.

Light service applications can be made by shifting the engineer's brake valve to application position, Fig. 8, and then to lap position, Fig. 7. This charges control reservoir 101 and causes the master relay mechanism to respond and establish a similar pressure in control line 14. The electric relay switch energizes windings 289 and 87 as the pneumatic relay valve moves to lap position. The air is supplied to control line 14 from reservoirs 207 by valves 281. At the same time supervisory line 13 is supplied with air at a rapid rate by the opening of valve 78, so that the reservoirs are recharged. The local relays respond and supply air from reservoirs 207 to brake cylinders 210.

If the application is quite light, the deceleration is insufficient to affect the deceleration controller, but applications above a chosen minimum bring the deceleration controller into action. When this degree of application has been established it is immaterial whether the engineer's brake valve be lapped or left in service position.

At or about the time the deceleration controller goes into action valve 116 will shift and establish the service deceleration rate through the shifting of piston 106. Thereafter the deceleration controller controls and gradually diminishes the pressure in control reservoir 101 so that the brakes are gradually released as the train slows. As a stop is approached valve 116 shifts back, piston 106 retreats and the train is brought to rest at a low deceleration rate.

At any time, the brakes may be released by shifting engineer's brake valve to release position. If the deceleration controller is in position to disconnect ports 96 and 99 the check valve 123 opens a bypass for releasing flow.

Emergency applications may be produced by moving the engineer's brake valve to emergency position, Fig. 9, and leaving it there. In emergency position main reservoir air flows through port 26 to pipe 21, shifts double check valve 63 and puts pipe 64 under main reservoir pressure. This operates the sander and throttle controller, and shifts piston 105 to establish the emergency deceleration rate. At the same time port 27 supplies main reservoir air through the application valve (which remains in the position of Fig. 1) to and through the deceleration controller to control reservoir 101, applying the brakes as in service but more rapidly. The deceleration controller then takes control and releases the brakes gradually at a rate which will maintain the high deceleration rate imposed by the heavy stressing of spring 102.

Such an application can be released at any time by shifting the engineer's brake valve to release position.

Automatic emergency applications are produced by venting the supervisory line. This may be caused by operation of the deadman valve, operation of the conductor's valve, or rupture of the supervisory line. The vent valves 189 respond and expedite venting. Piston 47 shifts outward and valve 50 cuts the engineer's brake valve out of control, and admits main reservoir air to line 73 and through the deceleration controller to chamber 101. At the same time valve 55 admits main reservoir air to pipe 56, opening the emergency circuit breaker 57, and interrupting the application circuit (switch 312 being open) so that the pneumatic master relay alone is operative. Double check valve 63 shifts and connects pipe 56 with pipe 64 to provide operation of the sander, throttle control and emergency setting of the deceleration controller.

Venting of supervisory line 13 causes the changeover valve 244 to shift under the urge of springs 254, 255, at each local relay, to the position of Fig. 11. If the control line 14 is also ruptured, control line pressure cannot build up and the local relay is operated by the changeover valve to produce an application whose intensity is limited to the setting of limiting valve 274. However, if the control line 14 is intact development of pressure in chamber 249 will restore the changeover valve 244 to its normal position (Fig. 5) cutting the limiting valve 274 out of control and restoring control by the deceleration controller when control line pressure approximates the pressures established by the limiting valve.

If the switch 312 be closed, the emergency circuit breaker 57 is inoperative, and, in effect, eliminated. In such case the application circuit is operative at all times and the electric master relay is effective to produce applications even when supervisory line pressure is reduced.

Since the changeover valve shifts to the position of Fig. 11 whenever supervisory line pressure is below a given value and since such shifting operates the relays to apply the brakes, it serves as a valuable safety device, applying the brakes until the system is charged to a safe value, and whenever the state of charge falls below such value.

What is claimed is:

1. In a fluid pressure brake system, the combination of a normally charged supervisory line; a control line; brake applying units connected with said lines and each including a local reservoir arranged to be fed from the supervisory line, a brake cylinder, a relay mechanism for supplying the brake cylinders with air from said reservoirs and for releasing air from the cylinders in response to variable pressure in the control line, and electrically actuated valves for supplying air from said reservoir to the control line and for venting the control line; relay means adapted to function in response to a variable regulatory pressure to vary the pressure in the control line, said relay means including switching means for selectively operating said electrically actuated valves; and two means for controlling said regulatory pressure, one of said means being manually operable and the other operating in response to depletion of supervisory line pressure.

2. In a fluid pressure brake system, the combination of a normally charged supervisory line; a control line; brake applying units connected with said lines and each including a local reservoir arranged to be fed from the supervisory line, a brake cylinder, a relay mechanism for supplying the brake cylinders with air from said reservoirs and for releasing air from the cylinders in response to variable pressure in the control line, and electrically actuated valves for supplying air from said reservoir to the control line and for venting the control line; relay means adapted to function in response to a variable regulatory pressure to vary the pressure in the control line, said relay means including switching means for selectively operating said electrically actuated valves; two means for controlling said regulatory pressure, one of said means being manually operable and the other operating in response to depletion of supervisory line pressure; and modulating means responsive to the decelerative rate produced by a brake application and serving to exercise secondary control on said regulatory pressure.

3. In a fluid pressure brake system the combination of a normally charged supervisory line; a control line; local brake equipments connected thereto and comprising brake cylinder, local reservoir, local relay normally subject to control line pressure, an associated automatic valve subject to supervisory line pressure and adapted to assume control of the local relay in response to reductions of supervisory line pressure, and local electrically actuated valves for admitting pressure fluid derived from the supervisory line to the control line and for venting fluid from the control line; master relay means subject to a regulatory pressure and opposing control line pressure and including valve means for admitting and exhausting pressure fluid to and from the control pipe and switches connected to selectively energize said electrically actuated valves; and two means for establishing said regulatory pressure, one being a manually operable valve, and the other an automatic valve functioning in response to supervisory line pressure.

4. In a fluid pressure brake system the combination of a normally charged supervisory line; a control line; local brake equipments connected thereto and comprising brake cylinder, local reservoir, local relay normally subject to control line pressure, an associated automatic valve subject to supervisory line pressure and adapted to assume control of the local relay in response to reductions of supervisory line pressure, and local electrically actuated valves for admitting pressure fluid derived from the supervisory line to the control line and for venting fluid from the control line; master relay means subject to a regulatory pressure and opposing control line pressure and including valve means for admitting and exhausting pressure fluid to and from the control line, and switches connected to selectively energize said electrically actuated valves; two means for establishing said regulatory pressure, one being a manually operable valve, and the other an automatic valve functioning in response to supervisory line pressure; and means for modulating said regulatory pressure comprising an admission and exhaust valve controlling the connection with said two means, and means responsive to deceleration produced by a brake application for actuating said admission and exhaust valve.

5. In a fluid pressure brake system, the combination of a normally charged supervisory line; a control line; brake applying units connected with said lines and each comprising a local reservoir arranged to be fed from the supervisory line, a brake cylinder, a relay mechanism for supplying the brake cylinders with air from said reservoirs and for releasing air from the cylinders in response to variable pressure in the control line, and electrically actuated valves for supplying air from the reservoir to the control line and for venting the control line; relay means adapted to function in response to a variable regulatory pressure to vary the pressure in the control line, said relay including switches for selectively energizing said electrically actuated valves; and two means for controlling said regulatory pressure, one of said means being manually operable and having a release position, a service position in which the regulatory pressure is developed at a normal rate, and an emergency position in which the regulatory pressure is developed at a more rapid rate, the second of said mechanisms having a normal position in which it provides for charging of the supervisory line and an abnormal position in which it terminates such charging and causes development of the regulatory pressure at an emergency rate.

6. In a fluid pressure brake system, the combination of a normally charged supervisory line; a control line; brake applying units connected with said lines and each comprising a local reservoir arranged to be fed from the supervisory line, a brake cylinder, a relay mechanism for supplying the brake cylinders with air from said reservoirs and for releasing air from the cylinders in response to variable pressure in the control line, and electrically actuated valves for supplying air from the reservoir to the control line and for venting the control line; relay means adapted to function in response to a variable regulatory pressure to vary the pressure in the control line, said relay including switches for selectively energizing said electrically actuated valves; two means for controlling said regulatory pressure, one of said means being manually operable and having a release position, a service position in which the regulatory pressure is developed at a normal rate, and an emergency position in which the regulatory pressure is developed at a more rapid rate, the second of said mechanisms having a normal position in which it provides for charging of the supervisory line and an abnormal position in which it terminates such charging and causes development of the regulatory pressure at an emergency rate; and means associated with the first-named electrically actuated valve, and operative at least when said second mechanism is in abnormal position to protect the charge in said reservoir.

7. In a fluid pressure brake system, the combination of a normally charged supervisory line; a control line; brake applying units connected with said lines and each comprising a local reservoir arranged to be fed from the supervisory line, a brake cylinder, a relay mechanism for supplying the brake cylinders with air from said reservoirs and for releasing air from the cylinders in response to variable pressure in the control line, and electrically actuated valves for supplying air from the reservoir to the control line and for venting the control line; relay means adapted to function in response to a variable regulatory pressure to vary the pressure in the control line, said relay including switches for selectively energizing said electrically actuated valves; two means for controlling said regulatory pressure, one of said means being manually operable and having a release position, a service position in which the regulatory pressure is developed at a normal rate, and an emergency position in which the regulatory pressure is developed at a more rapid rate, the second of said mechanisms having a normal position in which it provides for charging of the supervisory line and an abnormal position in which it terminates such charging and causes development of said regulatory pressure at an emergency rate; means operative in response to the deceleration produced by a brake application for modulating said regulatory pressure, such means responsive to deceleration including adjusting means for establishing different decelerative rates for service and for emergency applications; and means associated with said manually operable device and said automatic device for setting the deceleration controller to establish an emergency rate when either of said devices functions to produce an emergency application.

8. The combination with a fluid pressure brake system, of means responsive to the deceleration produced by a brake application for modulating the intensity of such application to establish a definite deceleration rate; means for adjusting said device to condition it to establish chosen deceleration rates appropriate to service and to emergency applications; brake controlling means for producing service and emergency applications of the brakes; means set in operation by said brake controlling means when the latter functions to produce a service application to set the means responsive to deceleration first to establish a service rate of deceleration and then reset it to establish a lower rate of deceleration; means effective when said controller is set to produce an emergency application to set the means responsive to deceleration to establish an emergency rate of deceleration.

9. The combination of a brake system including a normally charged supervisory line; a control line; a reservoir fed from the supervisory line; means for preventing back flow from the reservoir to the supervisory line; means for producing a brake application, said means including an electrically actuated valve for supplying air from the reservoir to the control line and a fluid pressure actuated switch for controlling said valve; means responsive to depletion of pressure in the supervisory line for actuating said switch; and means associated with said electrically actuated valve and effective at least when the means responsive to depletion functions to protect the charge in said reservoir.

10. In a fluid pressure brake system, the combination of a main reservoir; a supervisory line fed therefrom; at least one local reservoir fed from the supervisory line; a control line; brake applying means responsive to pressures in the control line; normally closed electrically controlled valves for supplying air from the main reservoir to the supervisory line and from the local reservoir to the control line during applications; switching means for controlling said electrically controlled valves; and means responsive to abnormal depletion of supervisory line pressure and serving to prevent the electrically controlled valves from dissipating the charges in the main and local reservoirs.

11. In a fluid pressure brake system, the combination of a normally charged supervisory line; a control line; at least one local reservoir arranged to be charged from the supervisory line; at least one brake applying means responsive to depletion of pressure in the supervisory line, and also to establishment of pressure in the control line to apply the brakes with air derived from said local reservoir; an electrically actuated valve for supplying air from the local reservoir to the control line to produce an application; master relay means adapted to admit and exhaust air to and from the control line and comprising switching means for actuating during brake applications said electrically actuated valves; an engineer's brake valve for exercising primary control on said master relay means; an application valve responsive to a reduction of supervisory line pressure to actuate said master relay means to produce a brake application by admitting air to the control line; and means effective at least when said application valve functions to prevent said electrically actuated valve from dissipating the pressure in the local reservoir.

12. In a two pipe straight air brake system, the combination of a normally charged supervisory line; local reservoirs charged therefrom; a control line; means responsive to control line pressure for applying the brakes with air from said local reservoirs and for releasing the brakes; means for developing brake applying pressure in the control line, said means including electrically actuated valves for supplying air from the local reservoirs to the control line; and means responsive to depletion of supervisory line pressure for actuating the last-named means.

13. In a two pipe straight air brake system, the combination of a normally charged supervisory line; local reservoirs charged therefrom; a control line; means responsive to control line pressure for applying the brakes with air from said local reservoirs and for releasing the brakes; means for developing brake applying pressure in the control line, said means including electrically actuated valves for supplying air from the local reservoirs to the control line; and means responsive to depletion of supervisory line pressure for actuating the last-named means and for protecting said local reservoirs against loss of charge through said electrically actuated valves.

14. In a two pipe straight air brake system, the combination of a normally charged supervisory line; a control line; local brake applying means on the vehicle including a reservoir charged from the supervisory line and a relay valve subject to control line pressure and operable by development of pressure in the control line to develop a brake applying pressure by flow from said reservoir, and by reduction of control line pressure to exhaust said brake applying pressure; means associated with each relay and subject to the depletion of supervisory line pressure to operate said relay to produce a brake application; and electrically actuated valve means associated with each relay valve for admitting air from the local reservoir to the control line and for locally venting said control line.

15. In a two pipe straight air brake system, the combination of a normally charged supervisory line; a control line; local brake applying means on the vehicle including a reservoir charged from the supervisory line and a relay valve subject to control line pressure and operable by development of pressure in the control line to develop a brake applying pressure by flow from said reservoir, and by reduction of control line pressure to exhaust said brake applying pressure; means associated with each relay and subject to the depletion of supervisory line pressure to operate said relay to produce a brake application; electrically actuated valve means associated with each relay valve for admitting air from the local reservoir to the control line and for locally venting said control line; and means effective when the supervisory line is vented for protecting said local reservoir against loss of charge through said electrically actuated valve means.

16. In a two pipe straight air brake system, the combination of a normally charged supervisory line; local reservoirs fed therefrom; a control line; a local relay normally responsive to changes of pressure in the control line to apply and release the brakes; means for varying control line pressure, said means including electrically actuated valve means for admitting pressure fluid from the local reservoir to the control line and for venting the control line; valve means for admitting pressure fluid to the control line from another source and for exhausting the control line; means for operating the last-named valve means and the electrically operated valve means in a predetermined relation to each other; means responsive to depletion of supervisory line pressure for actuating the last-named means to apply the brakes; and a mechanism associated with each relay and responsive to a depletion of supervisory line pressure to operate the relay to apply the brakes in the absence of pressure in the control line.

17. In a two pipe straight air brake system, the combination of a normally charged supervisory line; a control line; local brake controlling mechanisms on each vehicle, each such mechanism comprising a local reservoir fed from the supervisory line, a local relay responsive to control line pressure for applying the brakes with air from such reservoir and for releasing the brakes, and means responsive to supervisory line pressure and serving upon depletion thereof to operate said relay to apply the brakes; means for varying control line pressure, said means including electrically operated valves associated with said local brake controlling mechanisms and operable to increase control line pressure by supplying air from the corresponding local reservoir and to reduce control line pressure by venting the control line; and means responsive to the depletion of supervisory line pressure for operating said last-named means.

18. In a straight air brake system, the combination of a normally charged supervisory line; a control line; a relay normally subject to control line pressure; a local reservoir fed from the supervisory line and connected to said relay to supply air for brake applications; a valve mechanism subject to supervisory line pressure and serving on depletion thereof to disconnect the relay valve from the control line and operate the relay to apply the brakes; means responsive to the development of control line pressure for restoring the last-named valve means irrespective of the depletion of supervisory line pressure, whereby the control line is again connected in controlling relation with the relay; and electrically operated means for locally developing control line pressure by connecting said reservoir with the control line.

19. In a straight air brake system, the combination of a normally charged supervisory line; a control line; a relay normally subject to control line pressure; a local reservoir fed from the supervisory line and connected to said relay to supply air for brake applications; a valve mechanism subject to supervisory line pressure and serving on depletion thereof to disconnect the relay valve from the control line and operate the relay to apply the brakes; means responsive to the development of control line pressure for restoring the last-named valve means irrespective of the depletion of supervisory line pressure, whereby the control line is again connected in controlling relation with the relay; electrically operated means for locally developing control line pressure by connecting said reservoir with the control line; and means responsive to depletion of supervisory line pressure for actuating said electrically actuated valve means.

20. The combination of a normally charged supervisory line; a control line; a local reservoir fed by the supervisory line; a brake cylinder; a local relay subject to control line pressure for admitting pressure fluid from said reservoir to the brake cylinder and for exhausting the brake cylinder; electrically operable valve means for alternatively admitting air from the local reservoir to the control line and exhausting air from the control line, said electrically operable valve means being located in proximity to the relay valve; and means responsive to a substantial reduction of supervisory line pressure for actuating said local relay to admit pressure fluid to the brake cylinder.

21. The combination with a brake system including a supervisory line and a control line, of an engineer's brake valve manually operable to exercise a primary control on control line pressure; an application valve responsive to reductions of supervisory line pressure to establish pressure in the control line; a deceleration controller for exercising a modulating control on control line pressure in response to deceleration produced by brake application, said deceleration controller including loading means for establishing different deceleration rates; and connections between the engineer's brake valve and the application valve on the one hand and the deceleration controller and its loading means on the other hand, one of such connections including a double-throw check valve adapted to place the application valve and the brake valve selectively in connected relation.

22. The combination of a fluid pressure brake system, including a control reservoir, a control line whose pressure varies in response to pressure in the control reservoir, and a normally charged supervisory line; a valve device responsive to deceleration produced by brake applications and serving to modulate control reservoir pressure; loading means for setting said modulating valve device to maintain different deceleration rates; an engineer's brake valve connected with said reservoir through said modulating valve device; an application valve adapted to respond to reductions of supervisory line pressure and connected with said reservoir through said modulating valve device; a loading connection between said engineer's brake valve and the loading means of said modulating valve device; and a loading connection between said application valve and the said loading means.

23. The combination of a fluid pressure brake system, including a control reservoir, a control line whose pressure varies in response to pressure in the control reservoir, and a normally charged supervisory line; a valve device responsive to deceleration produced by brake applications and serving to modulate control reservoir pressure; loading means for setting said modulating valve device to maintain different deceleration rates; an engineer's brake valve connected with said reservoir through said modulating valve device; an application valve adapted to respond to reductions of supervisory line pressure and connected with said reservoir through said modulating valve device; and connections between said engineer's brake valve and said application valve on the one hand, and the loading means of said modulating valve device on the other, said connections including a double-seated check valve, for isolating the brake valve from the application valve, and for connecting said valves selectively with said loading means.

24. In a fluid pressure brake, the combination of a normally charged supervisory line; a control line; brake applying means responsive to reduction of pressure in the supervisory line, and to establishment of pressure in the control line; an engineer's brake valve for exercising primary control on pressure in the control line; an application valve responsive to pressure reductions in the supervisory line to admit pressure fluid to the control line; a deceleration controller for exercising a supervisory control on pressure in the control line and comprising a modulating portion and an adjusting portion; and a double check valve for placing the engineer's brake valve and the application valve selectively in communication with one of said portions of said deceleration controller.

25. In a fluid pressure brake system, the combination of a main reservoir; a normally charged supervisory line; a control line; local reservoirs; relay means responsive to pressure differentials between the control line and a regulatory pressure, said relay means including a switch for selectively closing application and release circuits; electrically actuated valves forming part of the application circuit and functioning when energized to admit air from main and local reservoirs to the supervisory and control lines respectively; and means rendered effective by the rupture of the supervisory line to interrupt the application circuit.

26. The combination of a normally charged supervisory line; a control line, local brake applying means capable of producing an emergency application in response to a rise of pressure in the control line and in response to a pronounced reduction of pressure in the supervisory line; master relay means for establishing pressure in the control line, said master relay means including electric switching means; an electrically controlled valve arranged to be opened by the operation of said electric switching means to feed air to the supervisory line; a manually operable valve for operating said master relay means to produce a brake application; an application valve responsive to reduction in the supervisory line pressure to operate said master relay valve to produce an emergency application; and means rendered active by the response of the said application valve to inhibit the operation of said electrically actuated valve, whereby the operation of the application valve in response to reduction of supervisory line pressure suspends the supply of air to the supervisory line through said electrically actuated valve.

27. A two pipe straight air brake system comprising in combination, a normally charged supervisory line; a control line; means for establishing a brake applying pressure in the control line, the last-named means including a mechanically operated valve and electrically operated valves; and means responsive to depletion of pressure in the supervisory line to actuate said pressure establishing means while rendering the electrically operated valves thereof inactive.

28. A two pipe straight air brake system comprising in combination, a normally charged supervisory line; a control line; and means for establishing a brake applying pressure in the control line, the last-named means including mechanically operated valve and electrically operated valves, one of said electrically operated valves serving to supply air from the supervisory line to the control line and another serving to supply air to the supervisory line.

29. A two pipe straight air brake system comprising in combination, a normally charged supervisory line; a control line; means for establishing a brake applying pressure in the control line, the last-named means including mechanically operated valve and electrically operated valves, one of said electrically operated valves serving to supply air from the supervisory line to the control line and another serving to supply air to the supervisory line; and means responsive to depletion of pressure in the supervisory line to actuate said pressure establishing means while rendering the electrically operated valves thereof inactive.

30. In a fluid pressure brake system, the combination of a normally charged supervisory line; a control line; a reservoir charged from the supervisory line; a brake cylinder; a relay responsive to pressure in the control line for admitting pressure fluid from said reservoir to the brake cylinder; electrically controlled valve means for admitting pressure fluid from said reservoir to the control line; and means responsive to a substantial reduction of pressure in the supervisory line for causing admission of pressure fluid to the brake cylinder.

31. In a fluid pressure brake system, the combination of a normally charged supervisory line; a control line; a reservoir charged from the supervisory line; a brake cylinder; a relay responsive to pressure in the control line for admitting pressure fluid from said reservoir to the brake cylinder; electrically controlled valve means for admitting pressure fluid from said reservoir to the control line; means responsive to rupture of the supervisory line to admit pressure fluid to the control line; and means rendered effective by the response of the last-named means to suspend operation of said electrically controlled valve.

32. In a fluid pressure brake system, the combination of a source of pressure fluid; means for establishing a regulatory pressure; means responsive to the rate of deceleration produced by a brake application and serving to modulate such regulatory pressure; a control line; a supervisory line charged from said source; at least one local reservoir charged from said supervisory line; means preventing back flow from said local reservoir to the supervisory line; two relay motors each responsive to the differential between said regulatory pressure and pressure in said control line; valve means mechanically actuated by one of said motors and serving to regulate control line pressure by regulating supply of pressure fluid from said source to the control line and exhaust from the control line; electrically actuated valve means operable to regulate control line pressure by admitting pressure fluid from said local reservoir to the control line and exhausting the control line; and switching means operable by the other relay motor and controlling said electrically actuated valve means.

33. In a fluid pressure brake system, the combination of a source of pressure fluid; means for establishing a regulatory pressure; means responsive to the rate of deceleration produced by a brake application and serving to modulate such regulatory pressure; a control line; a supervisory line charged from said source; at least one local reservoir charged from said supervisory line; means preventing back flow from said local reservoir to the supervisory line; two relay motors each responsive to the differential between said regulatory pressure and pressure in said control line; valve means mechanically actuated by one of said motors and serving to regulate control line pressure by regulating supply of pressure fluid from said source to the control line and exhaust from the control line; electrically actuated valve means operable to regulate control line pressure by admitting pressure fluid from said local reservoir to the control line and exhausting the control line; switching means operable by the other relay motor and controlling said electrically actuated valve means; and means for differentiating the response of said relay motors whereby the second relay motor is rendered more sensitive to said pressure differentials.

34. In a fluid pressure brake system, the combination of a source of pressure fluid; means for establishing a regulatory pressure; means responsive to the rate of deceleration produced by a brake application and serving to modulate such regulatory pressure; a control line; a supervisory line charged from said source; at least one local reservoir charged from said supervisory line; means preventing back flow from said local reservoir to the supervisory line; two relay motors each responsive to the differential between said regulatory pressure and pressure in said control line; valve means mechanically actuated by one of said motors and serving to regulate control line pressure by regulating supply of pressure fluid from said source to the control line and exhaust from the control line; electrically actuated valve means operable to regulate control line pressure by admitting pressure fluid from said local reservoir to the control line and exhausting the control line; switching means operable by the other relay motor and controlling said electrically actuated valve means; and means rendered effective in part at least by motion of said mechanically actuated valve means to lap position to establish an increased resistance to response of the first motor to said pressure differentials.

35. In a fluid pressure brake system, the combination of a source of pressure fluid; means for establishing a regulatory pressure; means responsive to the rate of deceleration produced by a brake application and serving to modulate said regulatory pressure; a control line for controlling braking pressure; a supervisory line charged from said source; at least one local reservoir charged from said supervisory line; means preventing back flow from said local reservoir to said supervisory line; two motor means individually responsive to the differential between said regulatory pressure and pressure in said control line; valve means operated by one of said motor means and controlling the admission of pressure fluid from said source to said control line and exhaust of fluid from said control line; an admission circuit including at least one electrically operable valve controlling admission of pressure fluid from said local reservoir to said control line; an exhaust circuit including at least one electrically operable exhaust valve controlling exhaust from said control line; and switching means operable by the other of said motor means and arranged to energize said circuits selectively.

36. In a fluid pressure brake system, the combination of a source of pressure fluid; means for establishing a regulatory pressure; means responsive to the rate of deceleration produced by a brake application and serving to modulate said regulatory pressure; a control line for controlling braking pressure; a supervisory line charged from said source; at least one local reservoir charged from said supervisory line; means preventing back flow from said local reservoir to said supervisory line; two motor means individually responsive to the differential between said regulatory pressure and pressure in said control line; valve means operated by one of said motor means and controlling the admission of pressure fluid to said control line; an admission circuit including at least one electrically operable valve controlling admission of pressure fluid from said local reservoir to said control line; an exhaust circuit including at least one electrically operable exhaust valve controlling exhaust from said control line; switching means operable by the other of said motor means and arranged to energize said circuits selectively; and means for rendering said first motor means relatively less sensitive than said other motor means.

37. In a fluid pressure brake system, the combination of a source of pressure fluid; means for establishing a regulatory pressure; means responsive to the rate of deceleration produced by a brake application and serving to modulate said regulatory pressure; a control line for controlling braking pressure; a supervisory line charged from said source; at least one local reservoir charged from said supervisory line; means preventing back flow from said local reservoir to said supervisory line; two motor means individually responsive to the differential between said regulatory pressure and pressure in said control line; valve means operated by one of said motor means and controlling the admission of pressure fluid from said source to said control line and exhaust of fluid from said control line; an admission circuit including at least one electrically operable valve controlling admission of pressure fluid from said local reservoir to said control line; an exhaust circuit including at least one electrically operable exhaust valve controlling exhaust from said control line; and switching means operable by the other of said motor means and arranged to energize said circuits selectively; and means rendered effective at least in part by the valve means operated by one of said motor means in lap position to increase its resistance to motion during a brake application whereby said other motor means tends to assume control during the application.

38. In a fluid pressure brake system, the combination of a source of pressure fluid; means for establishing a regulatory pressure; a control line; a supervisory line charged with pressure fluid from said source; at least one local reservoir charged with pressure fluid from said supervisory line; means for preventing back flow from said reservoir to the supervisory line; a movable abutment subject to the differential between said regulatory pressure and pressure in said control line; valve means controlling admission of pressure fluid from said source to the control line and exhaust of pressure fluid from said control line, said valve means being operable by said abutment and having a lap position in which admission and exhaust are both closed; means effective in said lap position to increase the resistance to motion from such position; a second movable abutment subject to the differential between said regulatory pressure and pressure in said control line; electrically controlled valve means for admitting pressure fluid from said local reservoir to said control line and for exhausting pressure fluid from said control line; and electric switching means operable by said second abutment and connected to control said electrically controlled valve means.

39. In a fluid pressure brake system, the combination of a source of pressure fluid; means for establishing a regulatory pressure; a control line; a supervisory line charged with pressure fluid from said source; at least one local reservoir charged with pressure fluid from said supervisory line; means for preventing back flow from said reservoir to the supervisory line; a movable abutment subject to the differential between said regulatory pressure and pressure in said control line; valve means controlling admission of pressure fluid from said source to the control line and exhaust of pressure fluid from said control line, said valve means being operable by said abutment and having a lap position in which admission and exhaust are both closed; means effective in said lap position to increase the resistance to motion from such position; a second movable abutment subject to the differential between said regulatory pressure and pressure in said control line; electrically controlled valve means for admitting pressure fluid from said local reservoir to said control line and for exhausting pressure fluid from said control line; electric switching means operable by said second abutment and connected to control said electrically controlled valve means; and throttling means for delaying the effect of said regulatory pressure upon the first-named abutment.

40. In a brake system the combination of a source of pressure fluid; a control line; a supervisory line charged with pressure fluid from said source; at least one local reservoir charged with pressure fluid from said supervisory line; means for preventing back flow from said local reservoir to said supervisory line; and two relay valve mechanisms operable by differentials between a regulatory pressure and pressure in the control line to admit and exhaust pressure fluid from the control line, both of said mechanisms having a neutral position and the first one having a greater resistance to motion from said neutral position than the other, the first of said relay valve mechanisms serving to control admission from said source to said control line and exhaust from said control line, and the second controlling admission from said local reservoir to said control line and exhaust from said control line.

41. In a brake system, the combination of a source of pressure fluid; a control line; a supervisory line charged with pressure fluid from said source; at least one local reservoir charged with pressure fluid from said supervisory line; means for preventing back flow from said local reservoir to said supervisory line; two relay valve mechanisms operable by differentials between a regulatory pressure and pressure in the control line to admit and exhaust pressure fluid from the control line, both of said mechanisms having a neutral position and the first one having a greater resistance to motion from said neutral position than the other, the first of said relay valve mechanisms serving to control admission from said source to said control line and exhaust from said control line, and the second controlling admission from said local reservoir to said control line and exhaust from said control line; and flow restricting means for delaying the action of said pressure differentials on said first relay valve mechanism.

42. In a fluid pressure brake system, the combination of a source of pressure fluid; a supervisory line normally charged therefrom; a local reservoir charged from the supervisory line; means preventing back flow from said reservoir to the supervisory line; a normally vented control line; a brake cylinder; a relay valve comprising an actuating abutment normally subject to control line pressure, and valve means operable thereby to admit pressure fluid from said local reservoir to the brake cylinder and to exhaust said brake cylinder to control the application of the brakes; means responsive to the depletion of supervisory line pressure for interrupting communication between said control line and said relay valve and for subjecting the abutment of the relay valve to pressure fluid; means for establishing a regulatory pressure; and relay means responsive to the differential between said regulatory pressure and pressure in the control line and operating to admit pressure fluid from said source to the control line and from said local reservoir to the control line and to vent the control line.

43. In a fluid pressure brake system, the combination of a source of pressure fluid; a supervisory line normally charged therefrom; a local reservoir charged from the supervisory line; means preventing back flow from said reservoir to the supervisory line; a normally vented control line; a brake cylinder; a relay valve comprising an actuating abutment normally subject to control line pressure, and valve means operable thereby to admit pressure fluid from said local reservoir to the brake cylinder and to exhaust said brake cylinder to control the application of the brakes; means responsive to the depletion of supervisory line pressure for interrupting communication between said control line and said relay valve and for subjecting the abutment of the relay valve to pressure fluid; means for establishing a regulatory pressure; relay means responsive to the differential between said regulatory pressure and pressure in the control line and operating to admit pressure fluid from said source to the control line and from said local reservoir to the control line and to vent the control line; and means effective at least when the supervisory line is vented to prevent said relay means from dissipating the charge in said local reservoir by flow to the control line.

44. In a fluid pressure brake system, the combination of a source of pressure fluid; a supervisory line normally charged therefrom; a local reservoir charged from the supervisory line; means preventing back flow from the local reservoir to the supervisory line; a normally vented control line; a brake cylinder; a relay valve comprising an actuating abutment normally subject to control line pressure and valve means operable by said abutment to admit pressure fluid from said local reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; pressure limiting means for limiting the pressure so developed upon the abutment of the relay; means responsive to depletion of supervisory line pressure for developing pressure in the control line; means responsive to the development of control line pressure to a value equal to the pressure limitation imposed by said pressure limiting means and serving to restore communication between the control line and the relay abutment; means for establishing a regulatory pressure; and relay means responsive to the differential between said regulatory pressure and control line pressure and controlling the admission and exhaust of pressure fluid from said source and from said local reservoir to the control line and the exhaust of pressure from the control line.

45. In a fluid pressure brake system, the combination of a source of pressure fluid; a supervisory line normally charged therefrom; a local reservoir charged from the supervisory line; means preventing back flow from the local reservoir to the supervisory line; a normally vented control line; a brake cylinder; a relay valve comprising an actuating abutment normally subject to control line pressure, and valve means operable by said abutment to admit pressure fluid from said local reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; pressure limiting means for limiting the pressure so developed upon the abutment of the relay; means responsive to depletion of supervisory line pressure for developing pressure in the control line; means responsive to the development of control line pressure to a value equal to the pressure limitation imposed by said pressure limiting means and serving to restore communication between the control line and the relay abutment; means for establishing a regulatory pressure; relay means responsive to the differential between said regulatory pressure and control line pressure and controlling the admission and exhaust of pressure fluid from said source and from said local reservoir to the control line and the exhaust of pressure from the control line; and means effective at least when supervisory line pressure is depleted to preclude depletion of pressure in the local reservoir by flow to the control line.

46. In a fluid pressure brake the combination of a source of pressure fluid; a relay valve comprising an admission and exhaust valve means arranged to control brake application, and a movable abutment connected to actuate said valve means; a control line to whose pressure said abutment is normally subject; a supervisory line normally charged from said source; a local reservoir fed by said supervisory line and arranged to supply pressure fluid to said relay valve for brake applications; means responsive to venting of the supervisory line to isolate said abutment from said control line and subject it to pressure; pressure limiting means for limiting the pressure so developed upon said abutment; means responsive to control line pressure and serving when control line pressure attains the value established by said limiting means to subject said abutment to the pressure in said control line; means for establishing a regulatory pressure; and a relay subject to the differential between said regulatory pressure and the pressure in the control line, the last-named relay controlling admission of pressure fluid from said source to the control line and exhaust from said control line and also controlling the admission of air from said local reservoir to said control line.

47. In a fluid pressure brake the combination of a source of pressure fluid; a relay valve comprising an admission and exhaust valve means arranged to control brake application, and a movable abutment connected to actuate said valve means; a control line to whose pressure said abutment is normally subject; a supervisory line normally charged from said source; a local reservoir fed by said supervisory line and arranged to supply pressure fluid to said relay valve for brake applications; means responsive to venting of the supervisory line to isolate said abutment from said control line and subject it to pressure; pressure limiting means for limiting the pressure so developed upon said abutment; means responsive to control line pressure and serving when control line pressure attains the value established by said limiting means to subject said abutment to the pressure in the control line; means for establishing a regulatory pressure; a relay subject to the differential between said regulatory pressure and the pressure in the control line, the last-named relay controlling admission of pressure fluid from said source to the control line and exhaust from said control line and also controlling the admission of air from said local reservoir to said control line; and means effective at least when said supervisory line is vented to prevent the last-named relay from depleting the charge in said local reservoir.

48. In a fluid pressure brake system the combination of a relay valve comprising admission and exhaust valve means arranged to control a brake application, and a movable abutment connected to actuate said valve means; a control line to whose pressure said abutment is normally subject; a normally charged supervisory line; a local reservoir fed thereby arranged to supply pressure fluid to said relay valve for brake applications; means responsive to venting of the supervisory line to subject said abutment to a limited pressure; means effective when the supervisory line is vented, and then responsive to control line pressure, to put the control line into and out of controlling communication with said abutment as control line pressure passes above and below said limited pressure; means for establishing a regulatory pressure; and relay means responsive to said regulatory pressure and controlling admission and exhaust of pressure fluid to and from the control line, the last-named relay means including electrically actuated valve means for admitting pressure fluid from said local reservoir to the control line.

49. In a fluid pressure brake system the combination of a relay valve comprising admission and exhaust valve means arranged to control a brake application, and a movable abutment connected to actuate said valve means; a control line to whose pressure said abutment is normally subject; a normally charged supervisory line; a local reservoir fed thereby arranged to supply pressure fluid to said relay valve for brake applications; means responsive to venting of the supervisory line to subject said abutment to a limited pressure; means effective when the supervisory line is vented, and then responsive to control line pressure, to put the control line into and out of controlling communication with said abutment as control line pressure passes above and below said limited pressure; means for establishing a regulatory pressure; relay means responsive to said regulatory pressure and controlling admission and exhaust of pressure fluid to and from the control line, the last-named relay means including electrically actuated valve means for admitting pressure fluid from said local reservoir to the control line; and means for preventing said electrically actuated valve from depleting the charge in said local reservoir at least when the supervisory line is vented.

50. In a fluid pressure brake, in combination, a brake pipe, a brake cylinder, a relay valve device operated by an increase in fluid pressure for supplying fluid under pressure to the brake cylinder, manually controlled valve means for controlling the supply of fluid under pressure to said relay valve device, electroresponsive means for controlling the supply of fluid to said relay valve device, and means responsive to the pressure of the fluid in the brake pipe and controlling operation of the electroresponsive means for supplying fluid under pressure to the relay valve device.

51. In a vehicle brake system, the combination with a brake cylinder and a supply reservoir, of a relay valve device operable to control the supply of fluid under pressure from said supply reservoir to said brake cylinder, a control pipe adapted to be normally at atmospheric pressure, a brake pipe adapted to be normally charged with fluid under pressure, means operative according to the degree of pressure of fluid supplied to said control pipe for electropneumatically controlling operation of said relay valve device, means responsive to reduction of pressure in said brake pipe for also controlling operation of said relay valve device, a brake valve device operable to supply fluid under pressure to said control pipe in accordance with the desired degree of braking and operable to effect reductions in brake pipe pressure, and a retardation controller device for varying the pressure in said control pipe when the rate of retardation produced by an application of the brakes exceeds a chosen value.

52. In a fluid pressure brake apparatus, the combination with a brake cylinder, of means including a control pipe for effecting by straight air operation a supply of fluid under pressure to said brake cylinder, means including an emergency valve device for effecting by automatic operation a supply of fluid under pressure to said brake cylinder, a retardation controller device for controlling the pressure in said control pipe when the rate of retardation produced by application of the brakes exceeds a chosen value, pressure actuated means for varying the setting of the retardation controller device, and means for supplying fluid under pressure to said actuated means upon operation of said emergency valve device.

53. In a vehicle brake system, the combination with a brake cylinder, a brake pipe, a supply reservoir, and a main reservoir, of a relay valve device operable to control the supply of fluid under pressure from said supply reservoir to said brake cylinder, electroresponsive valve means for controlling operation of said relay valve device, automatic valve means for also controlling operation of said relay valve device, pressure actuated switch means for controlling operation of said electroresponsive valve means, an emergency valve device having a release position and adapted to be operated upon a reduction in brake pipe pressure to an application position, means for establishing a communication between said main reservoir and said switch means, said communication passing through said emergency valve device in release position, a brake valve device for controlling the flow of fluid through said communication, and means for establishing a by-pass communication around said brake valve device when said emergency valve device is actuated to application position.

54. In a fluid pressure brake system, in combination, a brake pipe, a control pipe, means responsive to an increase in fluid pressure in said control pipe for effecting an application of the brakes, a brake valve device for supplying fluid under pressure to said control pipe to a degree dependent upon the extent of movement of said brake valve device, and an emergency valve device controlling communication through which said brake valve device supplies fluid under pressure to said control pipe and operated upon an emergency rate of reduction in brake pipe pressure for closing said communication and for supplying fluid under pressure to said control pipe.

55. In a vehicle brake system, the combination with a brake cylinder, a brake pipe, a supply reservoir, and a main reservoir, of a relay valve device operable to control the supply of fluid under pressure from said supply reservoir to said brake cylinder, electroresponsive valve means for controlling operation of said relay valve device, pressure actuated switch means for controlling operation of said electroresponsive valve means, an emergency valve device having a release position and adapted to be operated upon a reduction in brake pipe pressure to an application position, means for establishing a communication between said main reservoir and said switch means, said communication passing through said emergency valve device in release position, a brake valve device for controlling the flow of fluid through said communication, means for establishing a by-pass communication around said brake valve device when said emergency valve device is actuated to application position, and a retardation controller device for controlling the flow of fluid to said switch means when the rate of retardation due to application of the brakes exceeds a chosen value, said retardation controller device being operable to control said flow regardless of operation of said emergency valve device.

56. In a vehicle brake system, the combination with a brake cylinder, a supply reservoir, and a main reservoir, of a valve device for controlling the supply of fluid under pressure from said supply reservoir to said brake cylinder, control means including a pressure actuated switch device for controlling operation of said valve device, means for establishing a communication from said main reservoir to said switch device, a brake valve device operable to control the flow of fluid through said communication, means for establishing a by-pass communication around said brake valve device, and an automatic valve mechanism for controlling said by-pass communication.

57. In a vehicle brake system, the combination with a brake cylinder, and a brake pipe, of means responsive to a reduction in brake pipe pressure for effecting a supply of fluid under pressure to said brake cylinder, a brake valve device for effecting reductions in brake pipe pressure, an emergency valve device operable upon initial reductions in brake pipe pressure at an emergency rate for reducing the pressure in said brake pipe to zero, an element on said brake valve device adapted to be held depressed by the hand of an operator, a foot valve device having an element adapted to be held depressed by the foot of an operator, and means responsive to the release of pressure from both of said elements simultaneously for causing operation of said emergency valve device to completely reduce the pressure in said brake pipe.

58. In a fluid pressure brake, in combination, a brake pipe, a brake cylinder, a relay valve device operated by an increase in fluid pressure for supplying fluid under pressure to the brake cylinder, manually controlled valve means for controlling the supply of fluid under pressure to said relay valve device, electroresponsive means for controlling the supply of fluid to said relay valve device, and means responsive to the pressure of the fluid in the brake pipe and controlling the effectiveness of the electroresponsive means.

59. In a fluid pressure brake system, in combination, a valve device operable upon a supply of fluid under pressure thereto to open a communication through which fluid under pressure is supplied to effect an application of the brakes, a retardation controller device for controlling applications of the brakes and having a chamber to which fluid under pressure is supplied to adjust the rate at which said retardation controller device is effective, a valve having a biased position and being shiftable to an application position to effect a supply of fluid under pressure to said valve device and to said retardation controller chamber, a pipe normally charged with fluid under pressure, and means operated upon a reduction of pressure in said pipe for shifting said valve to said application position.

60. In a fluid pressure brake system, in combination, a valve device operable upon a supply of fluid under pressure thereto to effect an application of the brakes, a retardation controller device for controlling application of the brakes and having a chamber to which fluid under pressure is supplied to adjust the setting thereof, a valve shiftable from a biased position to an application position to effect a supply of fluid under pressure to said valve device and to said chamber, a brake pipe, means operated upon a predetermined reduction in brake pipe pressure for shifting said valve to said application position, and a vent valve device for effecting said predetermined reduction in brake pipe pressure.

61. In a fluid pressure brake system, in combination, a retardation controller device for controlling applications of the brakes and having a chamber to which fluid under pressure is supplied to adjust the setting thereof, a first valve device operated upon a decrease in pressure for effecting a supply of fluid under pressure to said chamber, a pipe normally charged with fluid under pressure, and a second valve device operated upon a reduction in pressure in said normally charged pipe for effecting a decrease of pressure in said first valve device.

62. In a fluid pressure brake system, in combination a straight air pipe to which fluid under pressure is supplied to effect an application of the brakes, a retardation controller device for controlling the pressure of fluid supplied to said pipe and having a chamber to which fluid under pressure is supplied to adjust the setting of said retardation controller device, a slide valve shiftable from a biased position to an application position to effect a supply of fluid under pressure to said straight air pipe and to said chamber, a pipe normally charged with fluid under pressure, and means operated upon a reduction of pressure in said pipe for shifting said slide valve to said application position.

63. In a vehicle brake system, in combination, a brake cylinder, a magnet valve device operable to supply fluid under pressure to the brake cylinder and operable to cut off said supply, means for effecting operation of said magnet valve device to supply fluid under pressure to the brake cylinder, a retardation controller device operable at a chosen rate of retardation for effecting operation of said magnet valve device to cut off said supply, and means for varying the chosen rate at which the retardation controller device operates according to the pressure of fluid supplied to the brake cylinder.

64. In a fluid pressure brake, in combination, a brake pipe, a brake cylinder, a relay valve device operated by an increase in fluid pressure for supplying fluid under pressure to the brake cylinder, manually controlled valve means for controlling the supply of fluid under pressure to said relay valve device, electroresponsive means for controlling the supply of fluid under pressure to the relay valve device, said electroresponsive means including a valve device subject to and operated upon a reduction in the pressure of the fluid in the brake pipe for cutting off a communication through which said electroresponsive means supplies fluid under pressure to said relay valve device.

65. In a fluid pressure brake, in combination, a brake pipe, a brake cylinder, a relay valve device operated by an increase in fluid pressure for supplying fluid under pressure to the brake cylinder, manually controlled valve means for controlling the supply of fluid under pressure to said relay valve device, electroresponsive means for controlling the supply of fluid under pressure to the relay valve device, said electroresponsive means including a device subject to brake pipe pressure for controlling the supply of current thereto.

66. In a fluid pressure brake, in combination, a brake pipe, a control pipe, a reservoir, a brake cylinder, a relay valve device operated by an increase in fluid under pressure for supplying fluid under pressure from the reservoir to the brake cylinder, manually controlled means for controlling the supply of fluid under pressure to the control pipe and thereby to the relay valve device, electroresponsive means including an electrically operated valve device for controlling the supply of fluid under pressure from said reservoir to the relay valve and to the control pipe, means subject to and operative upon a reduction in the pressure fluid in the brake pipe for isolating said relay from the control pipe and thereby inhibiting the establishment of communication between the reservoir and the control pipe at a point intermediate the reservoir and the point on the control pipe at which fluid is supplied thereto by the manually controlled valve means, and means also subject to and operated upon a reduction in fluid pressure in the brake pipe for controlling the supply of current to the electrically operated valve device.

67. In a fluid pressure brake, in combination, a brake cylinder, a brake pipe, a control pipe, a relay valve device operated by an increase in fluid pressure in the control pipe for supplying fluid to the brake cylinder, manually controlled valve means for supplying fluid to the control pipe at one point, electrically operated means for supplying fluid to the control pipe at another point, and means subject to and operated upon a reduction in the pressure of the fluid in the brake pipe for interrupting the supply of current to the electrically operated means for supplying fluid to the control pipe.

68. In a fluid pressure brake, in combination, a brake pipe, a brake cylinder, a relay valve device operated by an increase in fluid pressure for supplying fluid under pressure to the brake cylinder, manually controlled valve means for controlling the supply of fluid under pressure to said relay valve device, electroresponsive means for controlling the supply of fluid under pressure to the relay valve device, and a device operated upon a reduction in pressure in the brake pipe for varying the current to said electroresponsive means, so that said means operates to cut off the supply of fluid to the said relay valve device.

69. In a railway train brake system, the combination with a straight air pipe, a brake pipe, and brake cylinders for one or more units in the train, of means operated upon an increase in pressure in said straight air pipe or a reduction of pressure in said brake pipe for effecting a supply of fluid under pressure to said brake cylinders, means for effecting a supply of fluid under pressure to said straight air pipe by electropneumatic operation, means for effecting a supply of fluid under pressure to said straight air pipe by straight air operation, means for effecting a reduction in brake pipe pressure, and manually operated means for controlling said last three means.

70. In a train braking apparatus, the combination with a brake cylinder; of a control valve device including a magnet valve unit, an automatic valve and a relay valve, said relay valve controlling the supply of fluid under pressure to and its release from said brake cylinder, said magnet valve unit and said automatic valve controlling fluid under pressure supplied to operate said relay valve; means for controlling said magnet valve unit and said automatic valve in accordance with a desired degree of braking; and means governed by the rate of retardation for controlling at least a portion of said magnet valve unit.

71. In a railway train brake system, the combination with a brake cylinder, a brake pipe and a straight air pipe, of means operable electropneumatically to supply fluid under pressure to said straight air pipe and brake cylinder to effect an application of the brakes, means operable upon a reduction in brake pipe pressure to effect a supply of fluid under pressure to said brake cylinder to effect an application of the brakes, control means for controlling said last two means, and means responsive to pressures in said straight air pipe for causing said control means to effect a lapping of the supply to said brake cylinder.

72. In a railway train brake equipment, the combination with brake cylinders on two or more units in the train and a brake pipe, of control valve devices on at least two units in the train for controlling the supply of fluid under pressure to and its release from said brake cylinders, means for effecting operation of said control valve devices electropneumatically or upon a reduction in brake pipe pressure, brake valve means on one unit in the train for controlling said last means both electropneumatically and according to reductions in brake pipe pressure, and means on another unit in the train rendered operable upon an emergency rate of reduction in brake pipe pressure due to operation of said brake valve means for venting the brake pipe on that unit.

73. In a train braking apparatus, in combination, a brake cylinder, a relay valve device for controlling the supply of fluid under pressure to and its release from said brake cylinder, means for establishing a communication through which fluid under pressure is supplied to operate said relay valve device, control means having contacts operable to application position responsive to movement of a control element, means responsive to movement of said contacts to application position for effecting a supply of fluid under pressure to said communication, a straight air pipe connected to said communication and adapted to have fluid under pressure supplied thereto corresponding to that supplied to operate said relay valve device, means responsive to a predetermined degree of fluid under pressure in said straight air pipe for actuating said contacts to lap position, a brake pipe, and an automatic valve device operated upon a reduction in brake pipe pressure for disconnecting said straight air pipe from said communication and for effecting another supply of fluid under pressure to said communication.

74. In a brake equipment for vehicles, in combination, a braking unit including a brake cylinder and electric self-lapping valve means for controlling the supply of fluid under pressure to said brake cylinder, manually operable means for controlling said electric self-lapping valve means, a retardation controller responsive to the rate of deceleration of the vehicle for regulating the pressure in said brake cylinder, and means responsive to the position of said manually operable means for varying the setting of said retardation controller.

75. In a railway train brake system, the combination with a brake cylinder, a brake pipe and a straight air pipe, of valve means operable electropneumatically to supply fluid under pressure to both said straight air pipe and brake cylinder and operable pneumatically upon a reduction in brake pipe pressure to effect a supply of fluid under pressure to said brake cylinder only, manually operated control means having contacts operable to effect electropneumatic operation of said valve means and a valve operable to effect reductions in brake pipe pressure, and means responsive to pressure in said straight air pipe for operating said contacts to effect lapping of the supply to said brake cylinder by electropneumatic operation.

76. In a vehicle brake system, in combination, a brake cylinder, a brake pipe, a valve device having a chamber and operable to supply fluid under pressure to the brake cylinder according to the degree of pressure of fluid supplied to said chamber, means operated upon a reduction in brake pipe pressure for supplying fluid under pressure to said chamber, means controlled electrically for also supplying fluid under pressure to said chamber, a manually controlled device for controlling the operation of said electrically controlled means, and means operated by fluid under pressure supplied to said chamber for operating said manually controlled device to effect operation of said electrically controlled means to cut off the supply of fluid under pressure to said chamber.

77. In a fluid pressure brake, in combination, a brake pipe, a brake cylinder, a supply reservoir, a relay valve device operated by an increase in fluid pressure for supplying fluid under pressure to the brake cylinder from the supply reservoir, manually controlled valve means for supplying fluid under pressure to the relay valve device, electrically operated means for supplying fluid under pressure to the relay valve device from the supply reservoir, and means subject to brake pipe pressure and operated on a reduction thereof to cut off the communication through which said electrically operated means supplies fluid from the supply reservoir to the relay valve device.

CHARLES A. CAMPBELL.